United States Patent
Sawada et al.

(10) Patent No.: US 7,252,327 B2
(45) Date of Patent: Aug. 7, 2007

(54) SUNROOF APPARATUS

(75) Inventors: Kazuki Sawada, Handa (JP); Toshio Iwata, Anjo (JP); Katsuyoshi Iwashita, Chiryu (JP); Kiyozumi Fukami, Anjo (JP); Shinji Sakai, Kariya (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 0 days.

(21) Appl. No.: 11/523,539

(22) Filed: Sep. 20, 2006

(65) Prior Publication Data

US 2007/0013210 A1 Jan. 18, 2007

Related U.S. Application Data

(62) Division of application No. 10/996,437, filed on Nov. 26, 2004, now Pat. No. 7,125,070.

(30) Foreign Application Priority Data

Nov. 27, 2003 (JP) ............................. 2003-397950

(51) Int. Cl.
*B60J 7/047* (2006.01)
(52) U.S. Cl. ................... 296/216.03; 296/223
(58) Field of Classification Search ............. 296/221, 296/223, 216.03
See application file for complete search history.

(56) References Cited

U.S. PATENT DOCUMENTS

| | | | | |
|---|---|---|---|---|
| 4,364,601 A | * | 12/1982 | Katayama et al. | 296/221 |
| 4,403,805 A | * | 9/1983 | Strem et al. | 296/221 |
| 4,601,512 A | * | 7/1986 | Boots | 296/221 |
| 4,643,478 A | * | 2/1987 | Boots | 296/221 |
| 4,647,105 A | * | 3/1987 | Pollard | 296/221 |

(Continued)

FOREIGN PATENT DOCUMENTS

EP 0 343 750 A1 11/1989

(Continued)

OTHER PUBLICATIONS

Two European Search Reports dated Jul. 1, 2005 and Mar. 18, 2005.

*Primary Examiner*—Dennis H. Pedder
(74) *Attorney, Agent, or Firm*—Buchanan Ingersoll & Rooney PC

(57) ABSTRACT

A sunroof apparatus comprises a movable panel provided on an opening portion of a vehicle roof and capable of tilting-up and sliding, a functional bracket that supports the movable panel, a drive member actuated to move in a longitudinal direction of a vehicle along a guide rail attached to the vehicle roof, a front shoe connected to the drive member for controlling the movements of a front portion of the functional bracket by means of a front functional member, as a consequence of moving in a longitudinal direction of the vehicle along the guide rail in accordance with the movements of the drive member and a rear shoe connected to the drive member for controlling movement of a rear portion of the functional bracket by means of a rear functional member, as a consequence of moving in a longitudinal direction of the vehicle along the guide rail in accordance with the movements of the drive member, wherein the front shoe and the rear shoe are supported by an identical guide portion of the guide rail.

3 Claims, 17 Drawing Sheets

U.S. PATENT DOCUMENTS

| | | | |
|---|---|---|---|
| 4,741,573 A * | 5/1988 | Yokota | 296/221 |
| 5,028,090 A * | 7/1991 | Huyer | 296/221 |
| 5,058,947 A * | 10/1991 | Huyer | 296/216.03 |
| 5,092,651 A * | 3/1992 | Baldwin et al. | 296/223 |
| 5,257,849 A | 11/1993 | Cheron et al. | |
| 5,259,662 A | 11/1993 | Huyer | |
| 5,275,461 A | 1/1994 | Cheron et al. | |
| 5,447,355 A * | 9/1995 | Kelm | 296/223 |
| 5,593,204 A | 1/1997 | Wahl et al. | |
| 5,632,523 A * | 5/1997 | Kelm | 296/223 |
| 5,941,598 A | 8/1999 | Cave et al. | |
| 6,224,146 B1 * | 5/2001 | Willard et al. | 296/216.03 |
| 6,568,750 B2 | 5/2003 | Radmanic et al. | |
| 6,619,732 B2 | 9/2003 | Radmanic | |
| 6,669,278 B2 * | 12/2003 | Patelczyk et al. | 296/220.01 |
| 2002/0163228 A1 * | 11/2002 | Wingen et al. | 296/223 |
| 2003/0141749 A1 | 7/2003 | Friedrich et al. | |

FOREIGN PATENT DOCUMENTS

| | | |
|---|---|---|
| EP | 0 517 318 A1 | 12/1992 |
| JP | 63-017114 | 1/1988 |
| JP | 3-169740 | 7/1991 |

* cited by examiner

FIG. 3
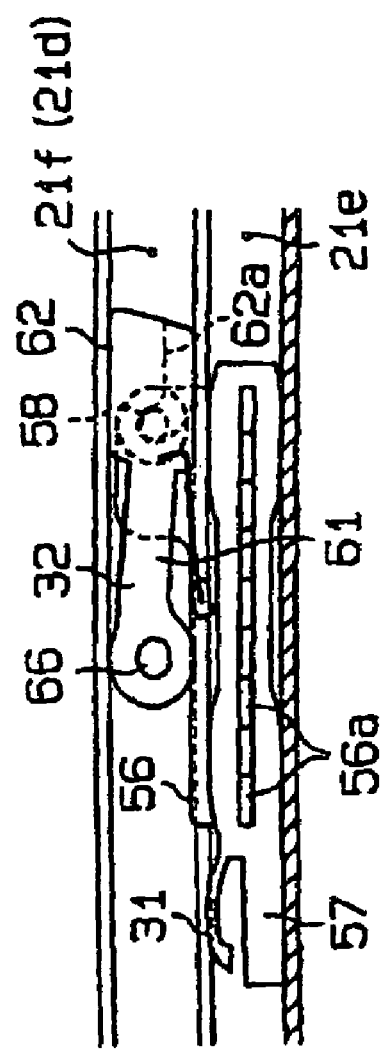
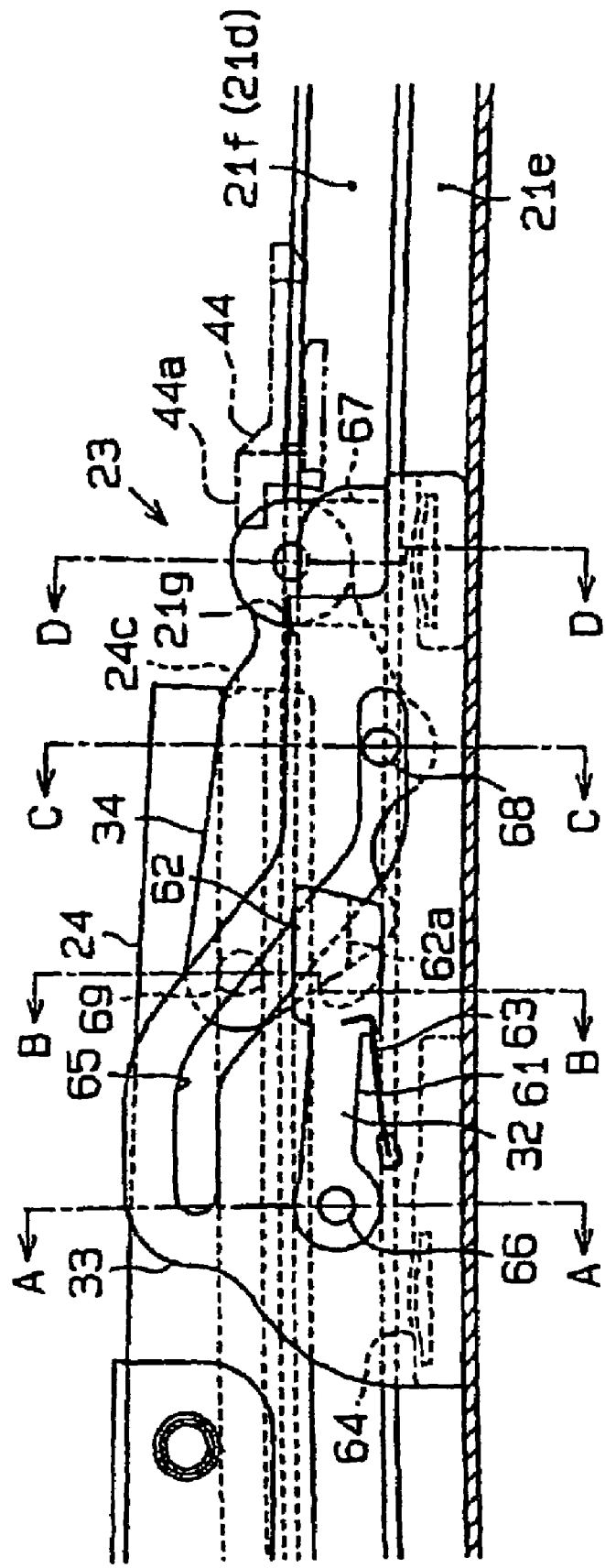

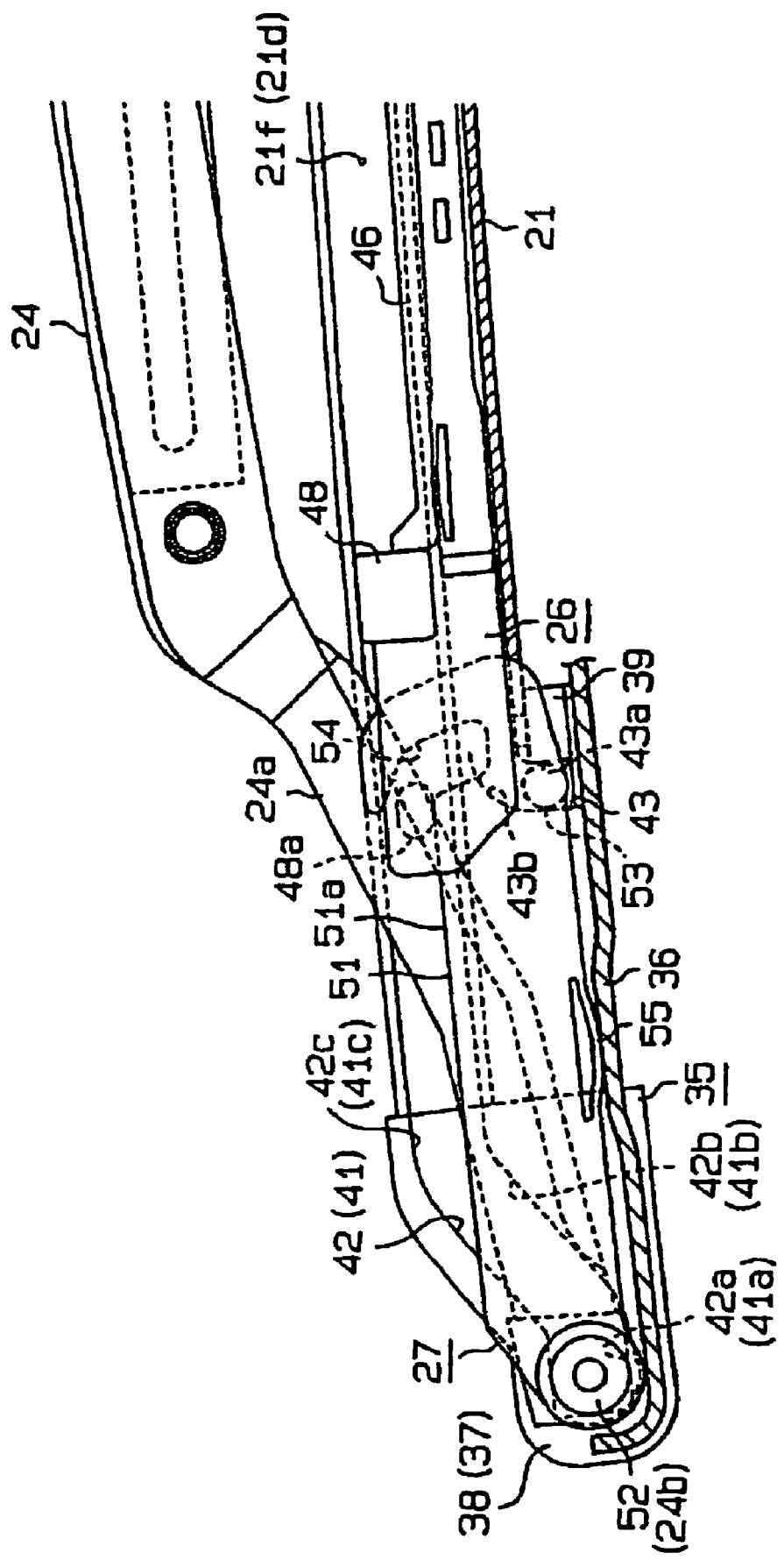

SUNROOF APPARATUS

This application is a divisional of prior U.S. application Ser. No. 10/996,437 filed on Nov. 26, 2004 now U.S. Pat. No. 7,125,070, and claims priority under 35 U.S.C. § 120 to such prior application, the entire content of which is incorporated herein by reference. This application also claims priority under 35 U.S.C. § 119 to Japanese Patent Application 2003-397950 filed on Nov. 27, 2003, the entire content of which is incorporated herein by reference.

FIELD OF THE INVENTION

This invention generally relates to a sunroof apparatus adapted to be mounted on a vehicle.

BACKGROUND

Various kinds of sunroof apparatuses are disclosed in patent documents, such as JP03169740A and U.S. Pat. Nos. 6,619,732 and 6,568,750.

According to the sunroof disclosed in JP03169740A, a shoe to which drive is transmitted from a drive member is provided at only the front portion of a functional bracket, and a long-shaped check block is provided at the rear portion of the functional bracket. In this configuration, each component has not been positioned flexibly because such long check block occupies a large area of a guide rail. Further, such long check block may cause unevenness of dimensional accuracy and flexure due to load. Furthermore, resistance of the check block relative to the guide rail may be increased. As a result, transmission efficiency may be decreased, and accuracy of movement control may be diminished.

Specifically, in this configuration, the functional bracket is provided between the check block, and the drive member and the shoe. Thus, a cross section area of the guide rail is enhanced. As a result, slide resistance of the check block has been obliged to be increased. In addition, the check block, the drive member and the shoe are not aligned relative to the functional bracket in a longitudinal direction thereof, and thus the moving amount of the functional bracket is limited so as to avoid interference therebetween. Furthermore, more space is needed for the guide rail whose cross section area is enhanced.

According to the sunroof disclosed in U.S. Pat. Nos. 6,619,732 and 6,565,750, a guide rail is provided outside the vehicle in order to open a movable panel more widely. Such configuration may complicate the structure of the sunroof. As a result, the number of the components and the cost may be increased.

Thus, a need exists for the sunroof apparatus to open a movable panel more widely without complicating the structure of the sunroof apparatus.

SUMMARY OF THE INVENTION

According to an aspect of the present invention, a sunroof apparatus comprises a movable panel provided on an opening portion of a vehicle roof and capable of tilting-up and sliding, a functional bracket that supports the movable panel, a drive member actuated to move in a longitudinal direction of a vehicle along a guide rail attached to the vehicle roof, a front shoe connected to the drive member for controlling the movements of a front portion of the functional bracket by means of a front functional member, as a consequence of moving in a longitudinal direction of the vehicle along the guide rail in accordance with the movements of the drive member and a rear shoe connected to the drive member for controlling movement of a rear portion of the functional bracket by means of a rear functional member, as a consequence of moving in a longitudinal direction of the vehicle along the guide rail in accordance with the movements of the drive member, wherein the front shoe and the rear shoe are supported by an identical guide portion of the guide rail.

According to another aspect of the present invention, a sunroof apparatus comprises a movable panel provided on an opening portion of a vehicle roof and capable of tilting-up and sliding, a functional bracket that supports the movable panel, a drive member actuated to move in a longitudinal direction of a vehicle along a guide rail attached to the vehicle roof, a front shoe connected to the drive member for controlling the movements of a front portion of the functional bracket by means of a front functional member, as a consequence of moving in a longitudinal direction of the vehicle along the guide rail in accordance with the movements of the drive member; a rear shoe connected to the drive member for controlling movement of a rear portion of the functional bracket by means of a rear functional member, as a consequence of moving in a longitudinal direction of the vehicle along the guide rail in accordance with the movements of the drive member; a guide block by which the rear functional member is secured to the guide rail, a lifting guide connected to the rear shoe and capable of rotating in upward and downward directions by virtue of moving in a longitudinal direction relative to the guide block, and a lifting link supported by the lifting guide and causes the movable panel to tilt up by virtue of intensifying a degree of the upward movement of the lifting guide at a time of upward rotation.

BRIEF DESCRIPTION OF THE DRAWINGS

The foregoing and additional features and characteristics of the present invention will become more apparent from the following detailed description considered with reference to the accompanying drawings, wherein:

FIG. 3 illustrates an enlarged view indicating a front portion of FIG. 1A;

FIG. 6 illustrates an enlarged view indicating a front portion of FIG. 1B;

DETAILED DESCRIPTION

First Embodiment

The first embodiment related to the present invention will be explained below with reference to the attached drawings.

Figure 12A:
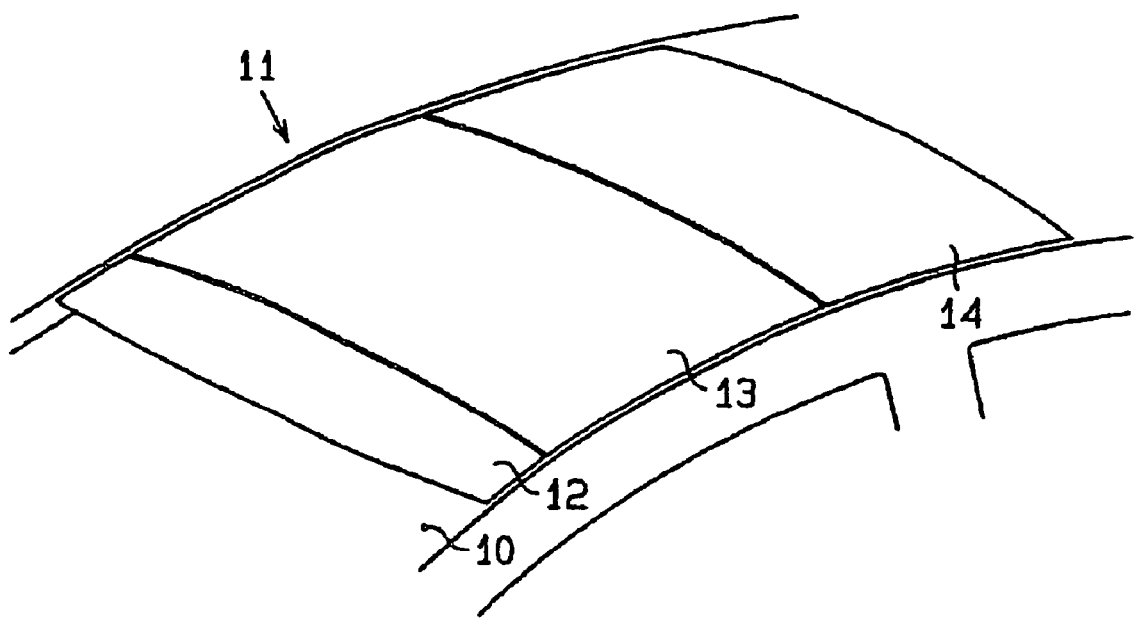
FIG. 12A illustrates a perspective view of a vehicle whose movable panel is in a closed state.
Figure 12B:
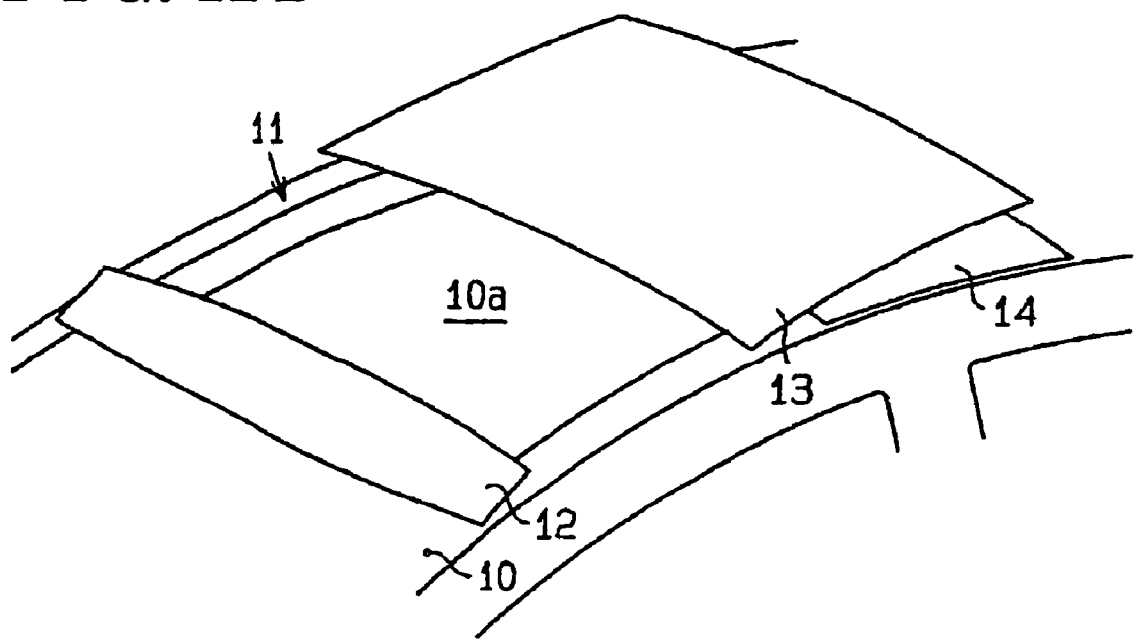
FIG. 12B illustrates a perspective view of a vehicle whose movable panel is in an opened state.

FIG. 12 illustrates a pattern diagram of a sunroof apparatus 11 mounted onto a roof 10 of a vehicle such as an automobile as seen from an obliquely upward direction. FIG. 12A indicates a closed state of the sunroof apparatus 11, and FIG. 12B indicates a fully open state of the sunroof apparatus 11.

As shown in FIG. 12, a roof opening 10a is provided on the roof 10. In order from the front of the vehicle to the rear of the vehicle, a deflector panel 12, a movable panel 13 and a fixed panel 14 are provided at the roof opening portion 10a. The deflector panel 12, the movable panel 13 and the fixed panel 14 are all made from for example glass plates through which light can enter, and are mounted so as to block the roof opening 10a from above when the sunroof apparatus 11 is in a closed state.

The deflector panel 12 is mounted so as to be capable of a tilt-up movement. Specifically, the deflector panel 12 is mounted so as to be rotatable relative to a front portion thereof, so that an end portion thereof can be lifted up. The deflector panel 12 starts a tilt-up movement in coordination with an opening movement of the movable panel 13. The movable panel 13 is attached at the roof opening 10a so as to be capable, by means of a mechanism described below, of both a tilt-up movement and a sliding movement in a longitudinal direction of the roof 10. The movable panel 13 is operated by a so-called outer-slide method and is accordingly capable of a sliding movement while remaining in a tilted-up position. The fixed panel 14 is fixed at the roof opening 10a with the roof opening 10a in a closed state at a position where the fixed panel 14 is provided.

Figure 1A:
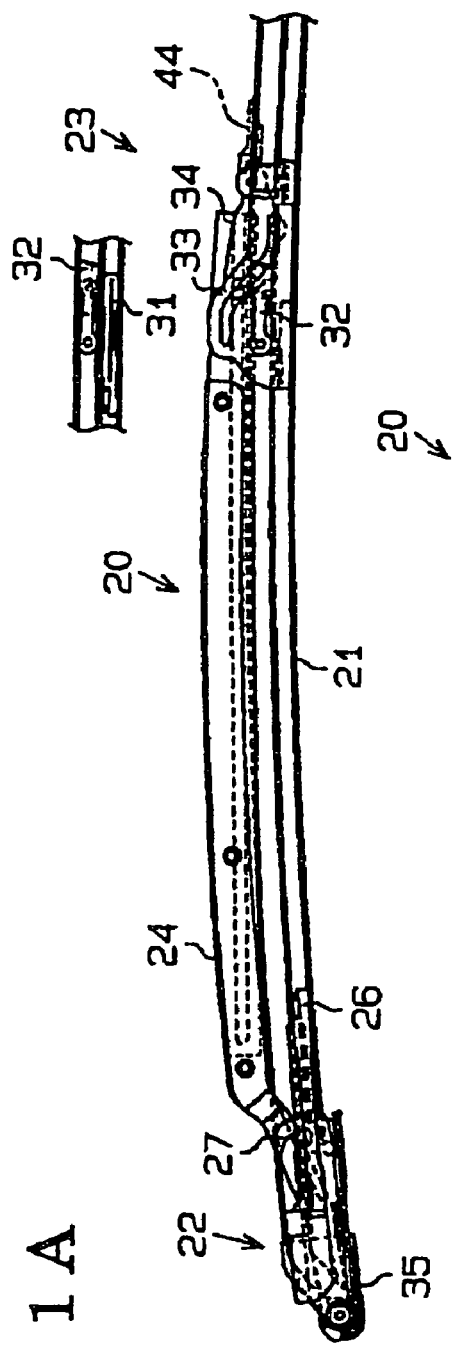
FIG. 1A, FIG. 1B and FIG. 1C illustrate cross sections indicating behavior of a first embodiment according to the present invention.
Figure 1B:
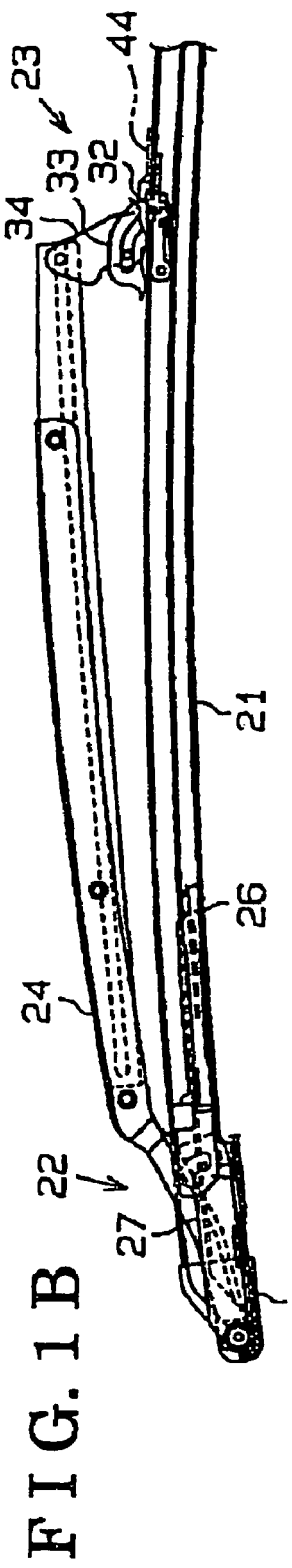
Figure 1C:
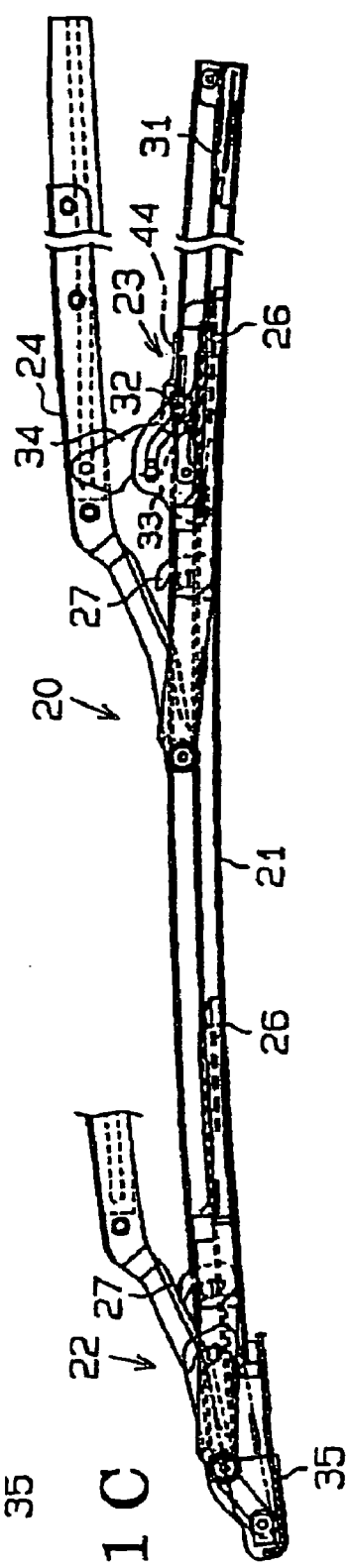

FIG. 1A, FIG. 1B and FIG. 1C represent side views illustrating the mechanism section 20 of the sunroof apparatus 11 by which the movable panel 13 is opened and closed. In this embodiment, two mechanism sections 20 are provided as a pair at both sides of the roof opening 10a, at corresponding positions at both sides in a vehicle width direction. This pair of mechanism sections 20 has similar structures except that they are both symmetrical relative to the center axis of the vehicle in a longitudinal direction thereof. FIG. 1A, FIG. 1B and FIG. 1C represent side views of one mechanism section 20 (provided on the right side in a front direction of the vehicle), as seen from the inside of the vehicle. Thus, each left side of FIG. 1A, FIG. 1B and FIG. 1C indicates a front portion of the vehicle, and each right side of FIG. 1A, FIG. 1B and FIG. 1C indicates a rear portion of the vehicle. A series of movements of the mechanism section 20 at a time when the movable panel 13 is opened is shown in stages in FIG. 1A, FIG. 1B and FIG. 1C. Specifically, FIG. 1A indicates a closed state, FIG. 1B indicates a tilted-up state and FIG. 1C indicates a fully-opened state.

As shown in FIG. 1A, FIG. 1B and FIG. 1C, the mechanism section 20 includes a guide rail 21, a front mechanism section 22 (a front functional member), a rear mechanism section 23 (a rear functional member) and a functional bracket 24. The movement of the functional bracket is regulated by the front mechanism section 22 at the front side, and the rear mechanism section 23 at the rear. The movable panel 13 is mounted on the functional bracket 24 (a mounted configuration of the movable panel 13 is not shown in FIGS. 1A, B and C).

Figure 2:
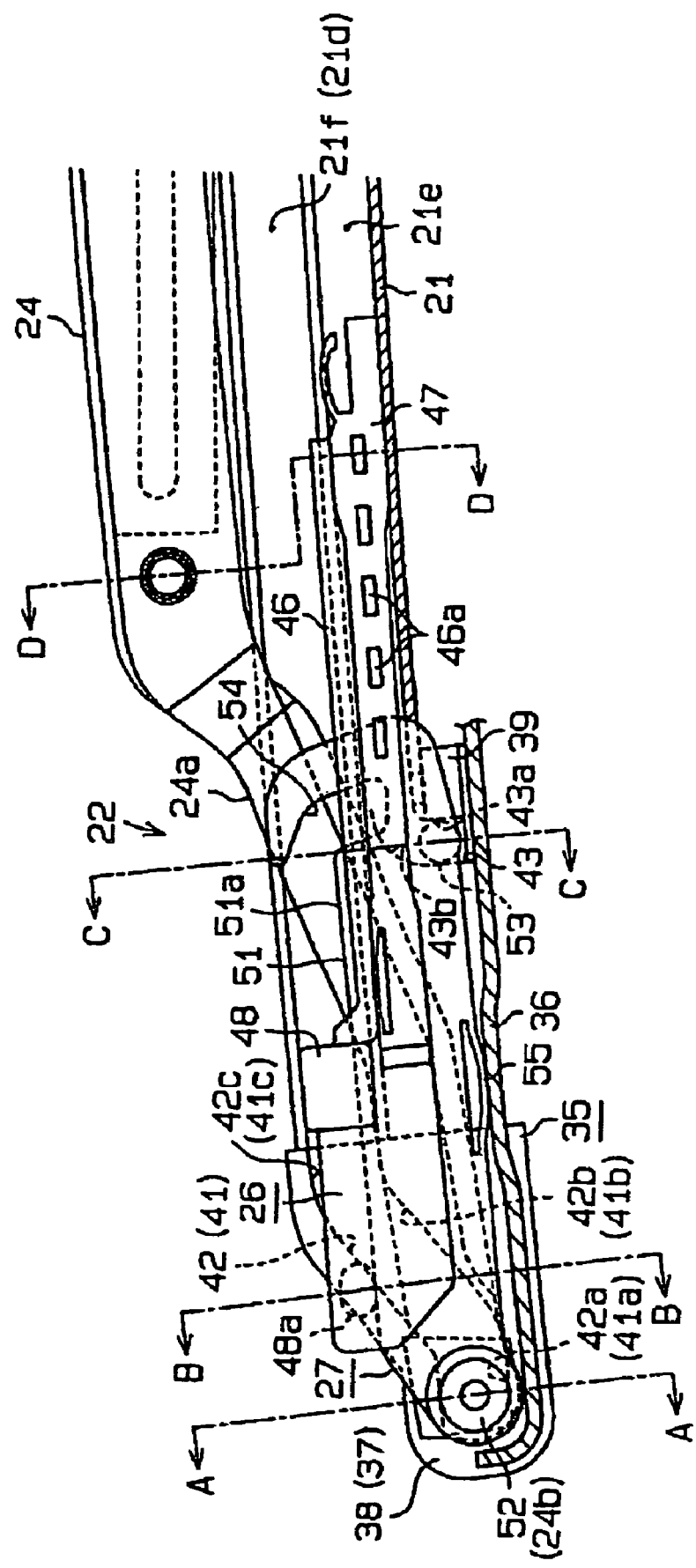
FIG. 2 illustrates an enlarged view indicating a rear portion of FIG. 1A.

The front portion of the mechanism section 20 shown in FIG. 1A is enlarged in FIG. 2, and the rear portion of the mechanism section 20 shown in FIG. 1A is enlarged in FIG. 3. As shown in FIG. 2, the front mechanism section 22 includes a front shoe 26 and a front check block 27 (a front functional member). As shown in FIG. 3, the rear mechanism section 23 includes a rear shoe 31, a rear check block 32 (a rear functional member), a lifting guide 33 and a lifting link 34. Because the rear shoe 31 is provided behind the lifting guide 33 and is not visible as seen from a side view, in FIG. 1A and FIG. 3 separate illustration of the rear shoe 31 of the rear mechanism portion 23 are provided for the sake of convenience.

Figure 4A:
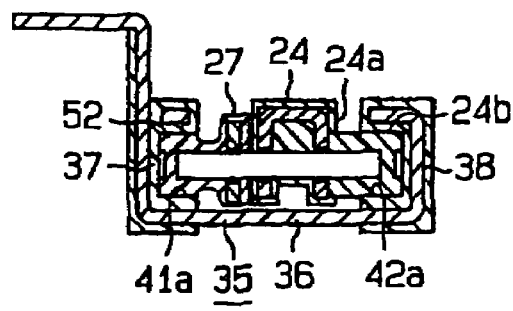
FIG. 4A, FIG. 4B, FIG. 4C and FIG. 4D illustrates cross sections of FIG. 2 along lines A-A, B-B, C-C and D-D.
Figure 4B:
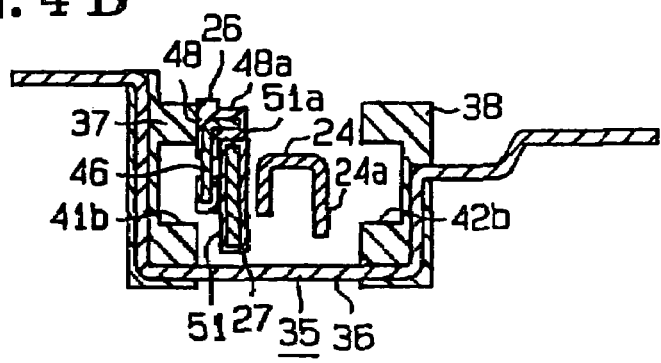
Figure 4C:
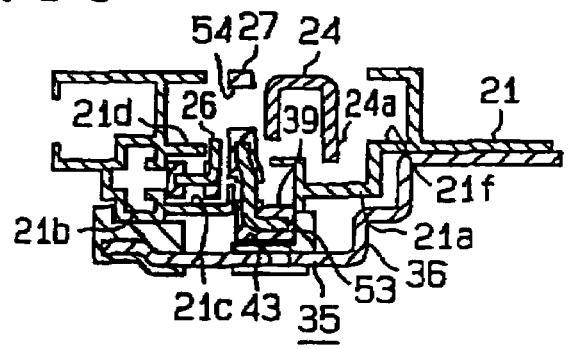

So as to be able to perform their respective movements, the front mechanism section 22 and the rear mechanism section 23 are housed in the guide rail 21. Specifically, as shown in FIG. 4A, which is a cross section of FIG. 2 along an A-A line; in FIG. 4B, which is a cross section of FIG. 2 along a B-B line; in FIG. 4C which is a cross section of FIG. 2 along a C-C line; and in FIG. 4D, which is a cross section of FIG. 2 along a D-D line; and as shown in FIG. 5A, which is a cross section of FIG. 3 along A-A line; in FIG. 5B, which is a cross section of FIG. 3 along a B-B line; in FIG. 5C, which is a cross section of FIG. 3 along a C-C line, and in FIG. 5D, which is a cross section of FIG. 3 along a D-D line; the guide rail 21 assumes substantially the same cross sectional form in a longitudinal direction thereof. For example, as shown in FIG. 4D, the guide rail 21 includes a plate portion 21a at a center portion of the guide rail 21 in a width direction thereof. Further, a belt guide portion 21b, a first guide portion 21c (a guide portion), a second guide portion 21d and a third guide portion 21e are formed at the plate portion 21a at one side of the guide rail 21 (the left side in FIG. 4D corresponding to the inner side of the vehicle). Specifically, the belt guide portion 21b is provided at a position closest to the central axis of the vehicle, at the most leftward side in FIG. 4D. The first guide portion 21c is provided in a position adjoining the belt guide portion 21b on the right side thereof, which corresponds to the outer side of the vehicle. The second guide portion 21d is provided in a position adjoining the first guide portion 21c at an upper side thereof. The third guide portion 21e is provided in a position adjoining the first guide portion 21c at the right side thereof. A fourth guide portion 21f is formed at the plate portion 21a on the other side of the guide rail 21 (the right side in FIG. 4D corresponding to the outer side of the vehicle).

As shown in FIG. 2 and FIG. 4, a guide block 35 is attached at the front end of the guide rail 21, and is a constituent section of the front mechanism section 22. The guide block 35 includes a frame 36, guide walls 37 and 38 and a regulating wall 39. The guide walls 37 and 38, which are made of resin, are provided on both sides of the frame 36 in a width direction thereof. The regulating wall 39, which is also made of resin, is provided on one side of the frame 36 (outer side of the vehicle) in a width direction thereof. The regulating wall 39 is provided at a position closer to the rear of the vehicle than the positions where the guide walls 37 and 38 are provided.

Guide grooves 41 and 42 are formed at the guide walls 37 and 38, and are respectively connected to openings formed at the respective ends of the second guide portions 21*d* and the fourth guide portion 21*f*. The guide grooves 41 and 42 include first guide groove portions 41*a* and 42*a*, second guide groove portions 41*b* and 42*b* and third guide groove portions 41*c* and 42*c*. The first guide groove portions 41*a* and 42*a*, whose front ends are closed, extend toward the rear in a longitudinal direction of the guide rail 21. The second guide groove portions 41*b* and 42*b* are connected to the first guide groove portions 41*a* and 42*a* and extend in an obliquely upward direction. The third guide groove portions 41*c* and 42*c* are connected to the second guide groove portions 41*b* and 42*b* and extend toward the rear side of the vehicle in a longitudinal direction of the guide rail 21 so as to be respectively connected with openings of each of the ends of the second guide portion 21*b* and the fourth guide portion 21*f*.

A regulating groove 43 is formed at the regulating wall 39 so as to be connected to an end opening of the third guide portions 21*e*. The regulating groove 43 includes a regulating groove portion 43*a* whose end is closed and which extends in an upper direction perpendicular to the longitudinal direction of the guide rail 21; and a guide groove portion 43*b*, which is connected to the regulating groove portion 43*a* and which extends in the shape of an arch and is connected with the end opening portion of the third guide portion 21*e*.

Figure 5A:
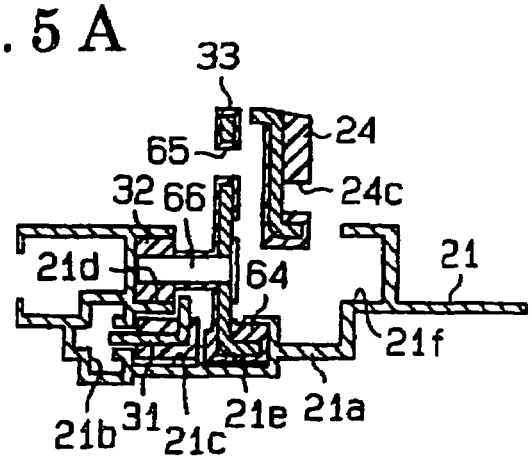
FIG. 5A, FIG. 5B, FIG. 5C and FIG. 5D illustrates cross sections of FIG. 3 along lines A-A, B-B, C-C and D-D.
Figure 5B:
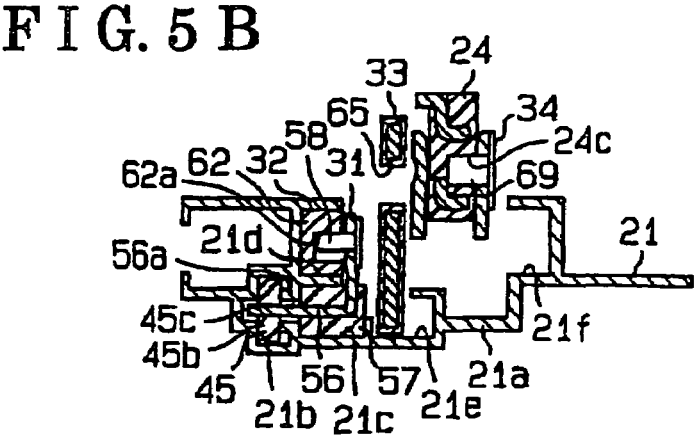
Figure 5C:
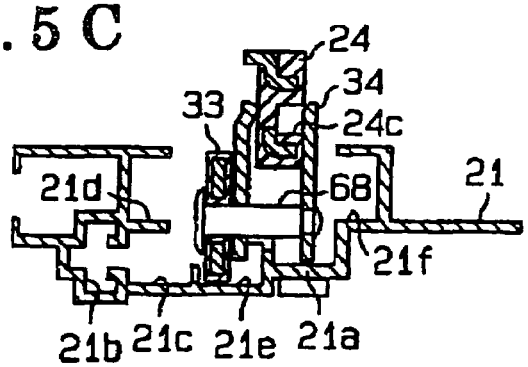
Figure 5D:
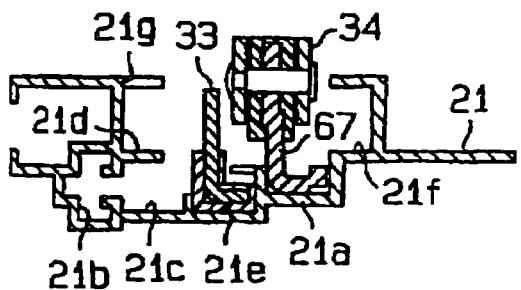

As shown in FIG. 5D, a notch 21*g* is formed in the vicinity of the lifting link 34 at an upper wall portion of the guide rail 21, a position where the second guide portion 21*d* is formed. A stopper 44 which forms a part of the rear mechanism section 23 is attached to the notch 21*g* at a rear thereof (shown in FIG. 3). The stopper 44 includes a regulating piece 44*a* which projects toward the notch 21*g* side at an upper portion of the wall portion that is positioned above the wall portion where the second guide portion 21*d* is formed.

Figure 4D:
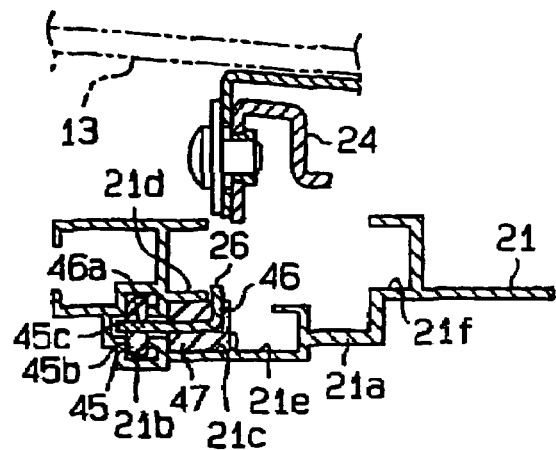
Figure 11:
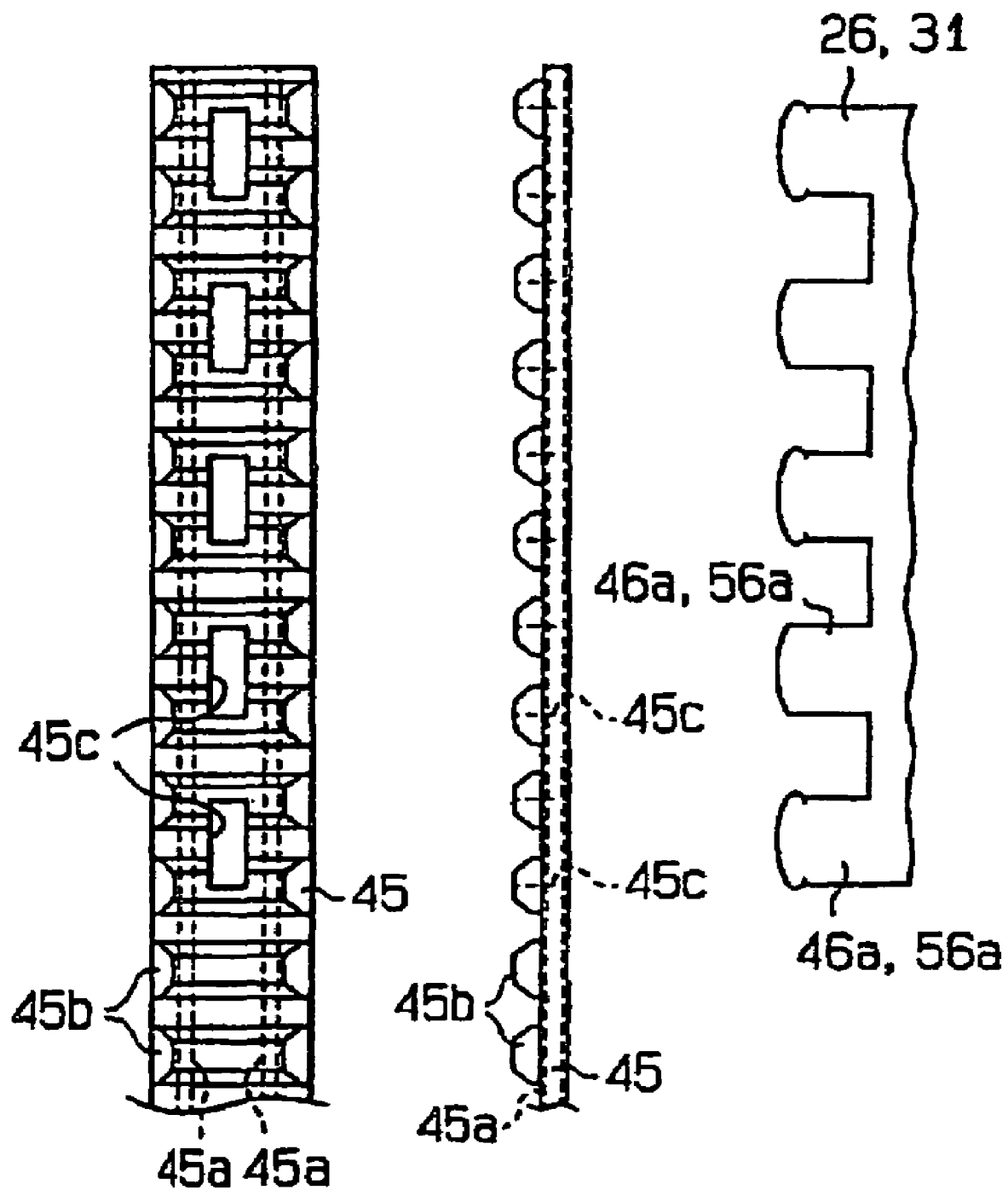
FIG. 11 illustrates an explanation drawing indicating the connection between the front/rear shoes and a drive belt.

As shown in FIG. 4D and FIG. 5B, a drive belt 45 (a drive member) is fit into the belt guide portion 21*b* so as to be engaged and connected with the output pulley of a motor (not shown). For the sake of convenience, the drive belt 45 is not shown in either FIGS. 4A, 4B and 4C; or in FIGS. 5A, 5C and 5D. As shown in FIG. 11, the drive belt 45, which is made of resin, includes a pair of wicks 45*a*, each made of steel, so as to reinforce the drive belt 45, and includes a plurality of the teeth 45*b*. Specifically, the wicks 45*a* are buried in the drive belt 45 at the one side and the other side in a width direction thereof so as to be parallel and extend in a longitudinal direction of the drive belt 45. Further, a plurality of mounting holes 45*c* (in this embodiment five holes) are formed in accordance with each position of the front shoe 26 and the rear shoe 31. Each mounting hole 45*c* is spaced with a predetermined distance in a longitudinal direction of the drive belt 45. The drive belt 45 is provided as the teeth 45*b* thereof face to an outward direction of the vehicle so as to be slidable in a longitudinal direction of the drive belt 45 and opens to the first guide portion 21*c*.

The front shoe 26 is slidably supported by the guide rail 21 (the first guide portion 21*c*). As shown in FIG. 2, the front shoe 26 includes a frame 46, which is of a bone structure, and a guide shoe 47 and an extending portion 48 which are both formed of resin at the frame 46. When the front shoe 26 is in a state of being supported by the guide rail 21, the front shoe 26 includes the guide shoe 47 at its rear side and the extending portion 48 at its front side.

As shown in FIG. 4D, the front shoe 26 is slidably supported on the guide rail portion 21*c* since the guide shoe 47 thereof is attached to the first guide portion 21*c*. Specifically, the frame 46 of the front shoe 26 includes a plurality of mounting pieces 46*a* (in the embodiment five mounting pieces) formed to fit into mounting holes 45*c* of the drive belt 45 which is fitted into the belt guide portion 21*b* through the guide shoe 47. As shown in FIG. 11, the mounting pieces 46*a* are formed to fit into the mounting holes 45*c*, and the front shoe 26 is connected to the drive belt 45 by means of the mounting pieces 46*a* fitted into the mounting holes 45*c*. Thus, the front shoe 26 slides along the first guide portion 21*c* in accordance with the movement of the drive belt 45 in a longitudinal direction of the belt guide portion 21*b*. Further, each mounting piece 46*a* includes a bulge at the end thereof, and it is thus difficult for it to slip out after it has been fitted into the mounting holes 45*c*.

Figure 10A:
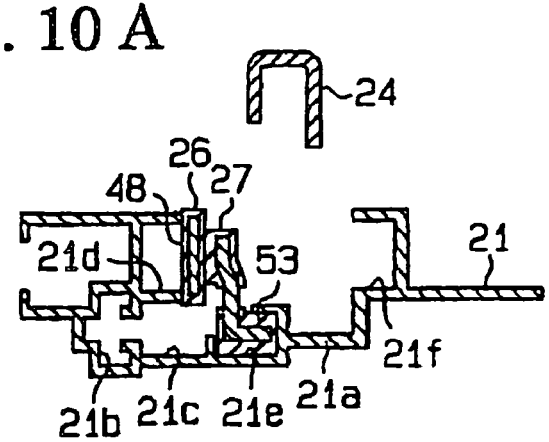
FIG. 10A, FIG. 10B and FIG. 10C illustrates cross sections of FIG. 9 along lines A-A, B-B and C-C.
Figure 10B:
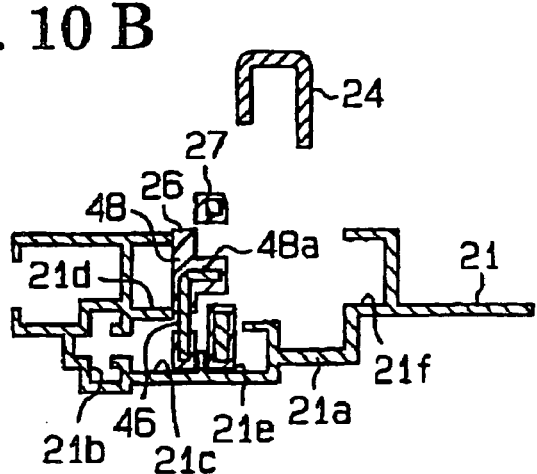

The extending portion 48 is provided at the upper end portion of the frame 46 which extends in an upwards direction from the opening portion formed at the third guide portion 21*e* on the extension of the longitudinal direction of the first guide portion 21*c* (see FIG. 10B). Moreover, an engaging pin 48*a* extending in the width direction of the extending portion 48 is provided at the front upper end portion of the extending portion 48. The engaging pin 48*a*, which is positioned at the same height as an opening formed between the second guide portion 21*d* and the fourth guide portion 21*f*, extends towards the fourth guide portion 21*f* on an extension of the longitudinal direction of the second guide portion 21*d* and the fourth guide portion 21*f*.

As shown in FIG. 2, the front check block 27 is positioned adjacent to the front shoe 26 between an arm portion 24*a* extending from the front end of the functional bracket 24, and the front shoe 26 itself. The front check block 27 includes a lever portion 51, a guide pin 52 and a regulating pin 53. These three elements are made of resin and provided at the frame of the front check block 27. The top rear end of the lever portion 51 extends from the lower portion thereof in an upward direction and further extends in a forward direction to form an engaging groove 54 having a hook-shaped inner wall. The inner wall of the engaging groove 54 extends so as to be above the position of at least the engaging pin 48*a*. In addition, the lever portion 51 includes a flexible portion 55 at a lower end surface thereof.

The guide pin 52 is of a column-shape and extends toward the guide wall portion 37 at the front end portion of the lever portion 51 (see FIG. 4A). The functional bracket 24 includes a guide pin 24*b* which is of a column-shape and extends toward the guide wall portion 38 at the end portion of the arm portion 24*a*. The front check block 27 is rotatably supported at the arm portion 24*a* such that the rotational axis of the front check block 27 corresponds to the common center axis of the guide pins 52 and 24*b*. Thus, when the sunroof apparatus 11 is in a closed state, the guide pin 52 is inserted into the guide groove 41, and the guide pin 24*b* is inserted into the guide groove 42 in such a way that the functional bracket 24 and the front check block 27 are integrally supported by the guide block 35. At this point, the guide pins 52 and 24*b* are positioned at the first guide groove portions 41*a* and 42*a*, which are themselves horizontal sections of the guide grooves 41 and 42.

Each of the guide pin 52 and the guide pin 24*b* includes a flexible structure made of resin at the outer peripheral surface thereof. Each flexible structure elastically contacts with each of the inner walls of the guide grooves 41 and 42 and in this way inhibits the functional bracket 24 and the front check block 27 from rattling when the sunroof apparatus 11 is in a closed state. Moreover, the flexible portion 55 elastically contacts with the frame 36 of the guide block 35 when the sunroof apparatus 11 is in the closed state and thus the functional bracket 24 and the front check block 27 are also inhibited by the flexible portion 55 inside the guide block 35.

The regulating pin 53 extends toward the regulating wall portion 39 at the rear end of the lever portion 51 of the front check block 27 (see FIG. 4C). Thus, the front check block 27 is also supported by the guide block 35 by virtue of the regulating pin 53 being inserted into the regulating groove 43 when the sunroof apparatus 11 is in a closed state.

As shown in FIG. 2 and FIG. 4, when the sunroof 11 is in a closed state, the lever portion 51 is restrained so as to be supported at an upper surface 51a thereof by the engaging pin 48a of the front shoe 26, and the movement of the front check block 27 in an upward direction and thus rendered impossible. Accordingly, even when the front shoe 26 is moved to the rear, as long as the upper surface 51a of the lever portion 51 is secured by the engaging pin 48a, and during this time, the regulating pin 53 is inserted into the regulating groove 43 and remains in an engaged state, the movements of the front check block 27 and the functional bracket 24 remain limited both in an upward direction and in a cross direction. However, even in such conditions, the functional bracket 24 still remains capable of rotating relative to the center axis of the guide pin 24b (guide pin 52).

The front portion of the sunroof apparatus 11, in a tilted-up state illustrated in FIG. 1B, is enlarged in FIG. 6. When the sunroof apparatus 11 is in a tilled-up state, the engaging pin 48a reaches the end portion of the lever portion 51 (upper surface 51a) at the same time as the front shoe 26 moves in a rear direction. Accordingly, when the front shoe 26 moves further in a rear direction, the engaging pin 48a is positioned in a concave portion of an engaging groove 54 which extends in a downward direction and has been formed on a surface of an inner surface of the engaging groove 54, which removes any restrictions on the front check block 27 moving in an upward direction (a disengaged state).

Figure 7:
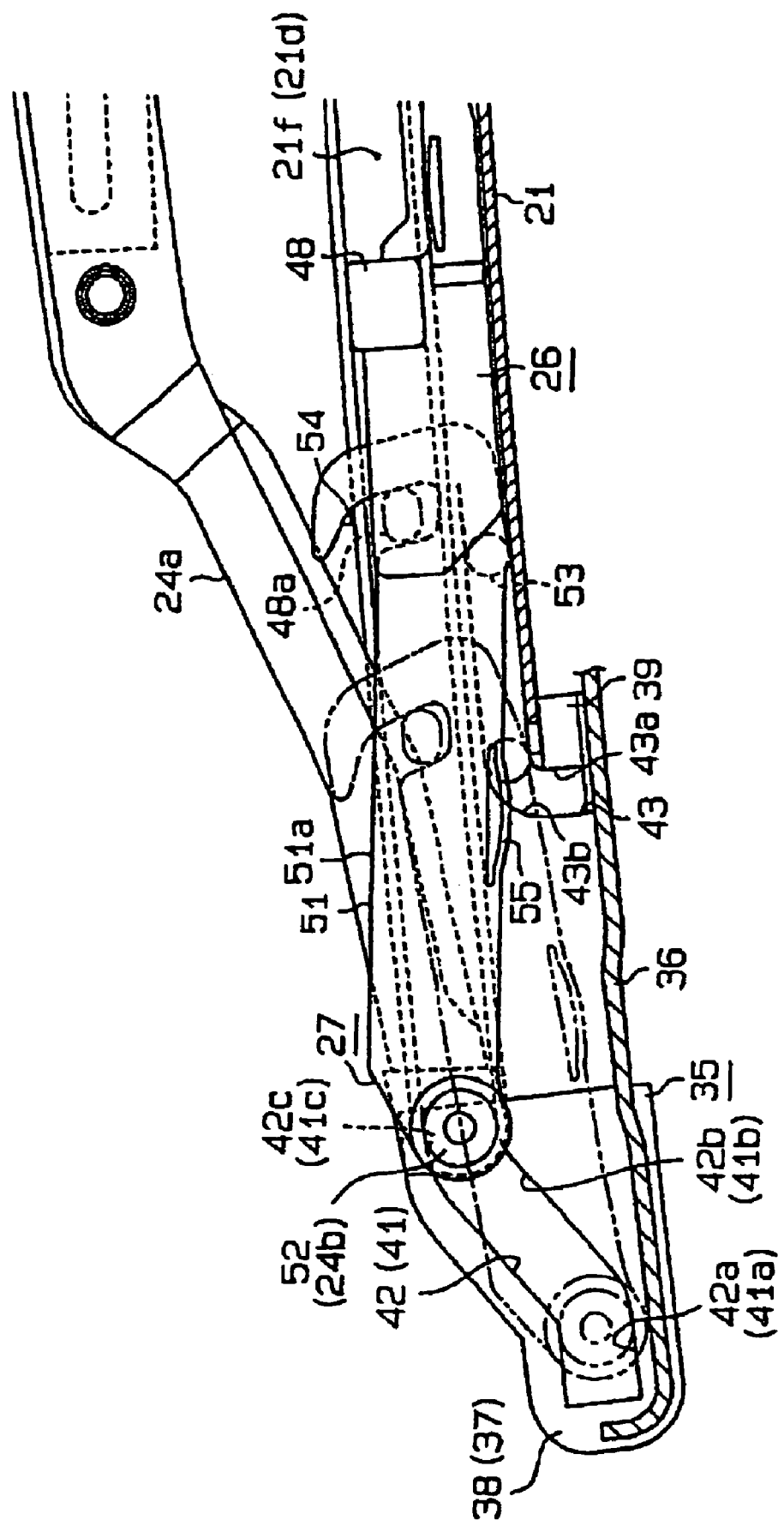
FIG. 7 illustrates an enlarged view indicating a front portion of FIG. 1C.

The front portion of the sunroof apparatus 11 illustrated in FIG. 1C is enlarged in FIG. 7. When the front shoe 26 is moved in a rear direction, the inner surface of the engaging groove 54 is pressed by the engaging pin 48a. Accordingly, the front check block 27 moves the guide pin 52 along the first guide groove portion 41a of the guide groove 41, and at the same time moves the regulating pin 53 along the regulating groove 43 in an upward direction. The engaging groove 54 is accordingly pushed in an upward direction. At this point, the regulating pin 53, which has moved upwards, is guided so as to fit into the third guide portion 21e, to which the regulating groove 43 is connected (see FIG. 7 and FIG. 10A).

Then, as the front shoe 26 moves further in a rear direction, the front check block 27 moves the regulating pin 53 along the third guide portion 21e. Further, the front check block 27 moves the guide pin 52 in an oblique upward direction along the second guide groove portion 41b of the guide groove 41. At the same time, the front check block 27 moves the guide pin 24b which is connected to the front check block 27, in an oblique upward direction along the second guide groove portion 42b of the guide groove 42, and as a result, the arm portion 24a is pushed in an upward direction. At this point, the guide pin 52, which has moved in an upward direction, is guided so as to fit into the second guide portion 21d, to which the guide groove 41 is connected through the third guide groove portion 41c. At the same time, the guide pin 24b of the functional bracket 24 is guided so as to fit into the fourth guide portion 21f, to which the guide groove 42 is connected through the third guide groove portion 42c.

As the front shoe 26 is moved further in a rear direction, and as the guide pin 52 is guided by the second guide portion 21d, and the regulating pin 53 is guided by the third guide portion 21e, the front check block 27 moves. At the same time, the functional bracket 24 moves as the guide pin 24b is guided by the fourth guide portion 21. The front check block 27 and the functional bracket 24 then combine together and move in a backward direction. Specifically, while the movable panel 13 slides into a fully-opened state after the arm portion 24a is lifted up, the functional bracket 24 is supported at a front portion thereof by the fourth guide portion 21f, to which the guide pin 24b is attached.

While, incidentally, the guide pin 52 of the front check block 27 slides along the second guide portion 21d, and the guide pin 24b of the functional bracket 24 slides along the fourth guide portion 21f, rattling can be inhibited because of the flexible structure formed on each end surface and on each outer peripheral surface of the guide pins 52 and 24b to be engaged with each inner surface of the second guide portion 21d and the fourth guide portion 21f.

The front shoe 26 at the rear moves back to the front side, in reverse order of the aforementioned process as follows. Specifically, as the front shoe 26 in a fully-opened state moves in a forward direction, the front inner surface of the engaging groove 54 is pushed by the engaging pin 48a, accordingly, the front check block 27 slides in a front direction as the guide pin 52 is guided by the second guide portion 21d, and the regulating pin 53 is guided by the third guide portion 21e; meanwhile the functional bracket 24 slides in a front direction as the guide pin 24b is guided by the fourth guide portion 21f, and the front check block 27 and the functional bracket 24 then combine and then move (slide) together in a forward direction. The guide pin 52 which has moved is guided so as to fit into the guide groove 41, to which the second guide portion 21d is connected through the third guide groove portion 41c. At the same time, the guide pin 24b of the functional bracket 24 is guided to fit into the guide groove 42 to which the fourth guide portion 21f is connected through the third guide groove portion 42c.

As the front shoe 26 is moved further in a front direction, the front check block 27 moves the regulating pin 53 along the third guide portion 21e, and also moves the guide pin 52 in an oblique downward direction along the second guide groove portion 41b of the guide groove 41. At the same time, the front check block 27 moves the guide pin 24b, which is connected to the front check block 27, in an oblique downward direction along the second guide groove portion 42b of the guide groove 42; and as a result, the arm portion 24a is pushed in a downward direction. At this point, the regulating pin 53, which has moved along the third guide portion 21e, is guided to fit into the regulating groove 43, to which the third guide portion 21e is connected.

As the front shoe is moved further in a front direction, and as the regulating pin 53 moves in a downward direction along the regulating groove 43, the front check block 27 is pulled down, and at the same time the upper surface 51a of the lever portion 51 is pressed by the engaging pin 48a which is disengaged from the engaging grove 54 so as to limit the movement of the front check block 27 in an upward direction. Because the movement of the front check block 27 is thus limited, the front shoe 26 is moved further in a front direction, and is finally restored to a closed state.

The reason why the front portion and the rear portion of the functional bracket 24 are lifted up before the sliding operation and lifted down after the sliding operation is to maintain the impenetrability of the interior of the vehicle. This is achieved by closing the roof opening 10a from above, specifically, by means of contacting elastically, and from above, the movable panel 13, which is attached to the functional bracket 24, to the seal member (not shown), which is provided at the roof opening 10a.

As described above, the front check block 27 includes not only a check function for regulating the movement of the front portion of the functional bracket 24, but also a link function for lifting up and down the front portion of the functional bracket 24 and sliding the front portion of the functional bracket in a cross direction. Such the front check block 27 has been provided closer to the rear, relative to the center point (guide pin 24b) of the rotation of the functional bracket 24, because the slide amount of the functional bracket 24 may be limited if the front check block 27 is provided at more front side relative to the center point of the rotation of the functional bracket 24.

The rear shoe 31 is slidably supported on the guide rail 21 (the first guide portion 21c) in the same manner as the front shoe 26. As shown in FIG. 3, the rear shoe 31 includes a frame 56 of a bone structure, and a guide shoe 57 formed at the frame 56 of resin and an engaging pin 58. While the rear shoe 31 is supported by the guide rail 21, the engaging pin 58 is positioned at the rear.

As shown in FIG. 5B, the rear shoe 31 is supported to the first guide portion 21c as the guide shoe 57 thereof is attached to the first guide portion 21c. Specifically, the frame 56 of the rear shoe 31 includes a plurality of mounting pieces 56a (in the embodiment 5 mounting pieces) formed to fit into mounting holes 45c of the drive belt 45 which is fitted into the belt guide portion 21b through the guide shoe 57. As shown in FIG. 11, the mounting pieces 56a are formed to be fit into the mounting holes 45c, and the rear shoe 31 is connected to the drive belt 45 with the mounting pieces 56a fitted into the mounting holes 45c. Thus, the rear shoe 31 slides on the first guide portion 21c in conjunction with the movement of the drive belt 45 in a longitudinal direction of the belt guide portion 21b in the same manner as the front shoe 26.

The engaging pin 58 is provided at an upper end portion of the frame 56 which extends in an upward direction from the opening portion formed at the third guide portion 21e side of the first guide portion 21c (see FIG. 5B). The engaging pin 58 is provided at the same height as the opening which is formed with the second guide portion 21d and the fourth guide portion 21f and extends in the width direction of the rail towards the second guide portion 21d.

As shown in FIG. 3, the rear check block 32 includes a lever portion 61 rotatably supported by the lifting guide 33 and an engaging portion 62 formed at the end of the lever portion 61. The lever portion 61 extends in a rear direction along the second guide portion 21d, and the rear check block 32 is supported by the second guide portion 21d as the engaging portion 62 of the rear check block 32 is fitted into the second guide portion 21d. A biasing force is applied to the rear check block 32 by a biasing member 63 held by the lifting guide 33 toward the upper wall of the second guide portion 21d.

An engaging groove 62a is formed at the engaging portion 62 and extends to the front from the lower rear end of the engaging portion 62 in a longitudinal direction thereof and further extends in an upward direction. The engaging pin 58 of the rear shoe 31 is engaged with the engaging groove 62a when the engaging portion 62 is attached to the second guide portion 21d. Thus, in such configuration, the rear check block 32 moves on the second guide portion 21d integrally with the lifting guide 33 according to the movement of the rear shoe 31 in a longitudinal direction.

Figure 8:
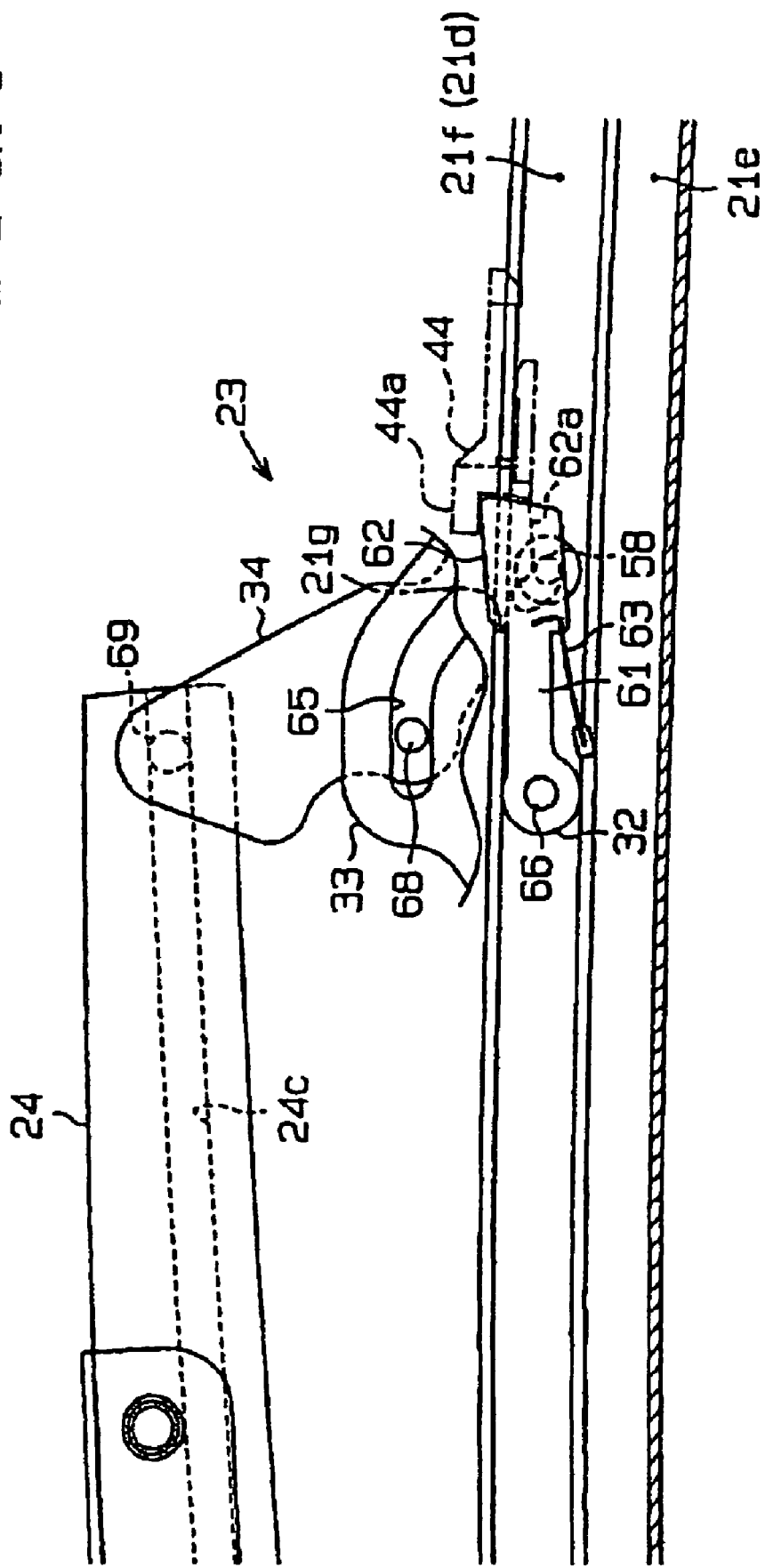
FIG. 8 illustrates an enlarged view indicating a rear portion of FIG. 1B.

The rear portion of the sunroof apparatus 11 illustrated in FIG. 1B is enlarged in FIG. 8. When the sunroof apparatus 11 is in the tilted-up state, the engaging portion 62 of the rear check block 32 reaches the notch 21g formed at the second guide portion 21d in accordance with the movement of the rear shoe 31 in a rear direction. The rear check block 21 is rotated in an upward direction by biasing force of the biasing member 63 until the engaging portion 62 is fitted into the notch 21g so as to be limited by the regulating piece 44a of the stopper 44. At this point, the engaging groove 62a positioned so as to release the engaging pin 58 of the rear shoe 31 in a backward direction so as to disengage the engaging pin 58 from the engaging groove 62a. The engaging groove 62a is formed to release the engaging pin 58 in a downward direction so that the engaging pin 58 does not interfere with the engaging groove 62a while the rear check block 32 is rotated in an upward direction. The rear shoe 31 can independently move in a rear direction if it is disconnected from the rear check block 32 and stops at the an appropriate position along with the lifting guide 33.

The lifting guide 33 is positioned adjacent to the rear shoe 31 and the rear check block 32. The lifting guide 33 includes a guide shoe 64, a guide hole 65 and a shaft 66 extending toward the rear check block 32 side for rotatably supporting the rear check block 32. The lifting guide 33 is supported by the third guide portion 21e as the guide shoe 64 is fit thereto (see FIG. 5A). The lifting guide 33 moves on the third guide portion 21e through the rear check block 32 in accordance with the longitudinal movement of the rear shoe 31 when the engaging pin 58 of the rear shoe 31 is engaged with the engaging groove 62a of the rear check block 32.

The guide hole 65 extends in an oblique lower direction from the upper front of the lifting guide 33 to the lower rear of the lifting guide 33. The lifting guide 33 is engaged with the lifting link 34 through the guide hole 65. Specifically, the lifting link 34 is lifted up/down in conjunction with the movement of the lifting guide 33 in a longitudinal direction.

More specifically, the lifting link 34 is rotatably supported by a bracket 67 fixed at the plate portion 21a of the guide rail 21 near the notch 21g (see FIG. 5D). Further, the lifting link 34 includes a guide pin 68 to be penetrated through the guide hole 65 at the front side relative to the center point of the rotation of the lifting link 34 as shown in FIG. 3. When the sunroof apparatus 11 is in the closed state, the guide pin 68 is positioned at the lower rear end of the guide hole 65. Thus, as the lifting guide 33 is moved in a rear direction, the guide pin 68 is moved in the oblique-upper direction along the guide hole 65 so that the lifting link 34 is rotated in the clockwise direction in FIG. 3 as the top end of the lifting link 34 is lifted up. When the sunroof apparatus 11 is in the tilted-up state, the guide pin 68 which has been moved in the oblique-upper direction along the guide hole 65 is positioned at the front upper end of the guide hole 65.

An engaging pin 69 is provided at the end of the lifting link 34 for supporting the functional bracket 24. Specifically, the engaging pin 69 of the lifting link 34 penetrates into a guide groove 24c which is formed on the outer surface of the functional bracket 24 in a longitudinal direction thereof. Thus, the functional bracket 24 is supported by the engaging pin 69 at the rear portion of the functional racket 24. In this configuration, during the tilted-up operation, the rear end of the functional bracket 24 is moved upward in accordance with the rotation of the lifting link 34 in the clockwise direction. When the rear shoe 31 in the front position is restored to the rear position, the sunroof apparatus 11 behaves in the reverse order.

When the lifting link 34 is rotated to be lifted up, the guide groove 24c into which the engaging pin 69 is inserted opens in a longitudinal direction thereof. In other words, the guide grove 24c opens in the slide direction of the functional bracket 24.

While the front portion of the functional bracket 24 is moved in a rear direction through the front check block 27 in accordance with the movement of the front shoe 26 in a rear direction, the functional bracket 24 is moved (slid) in a rear direction as the engaging pin 69 is guided along the guide groove 24c.

Figure 9:
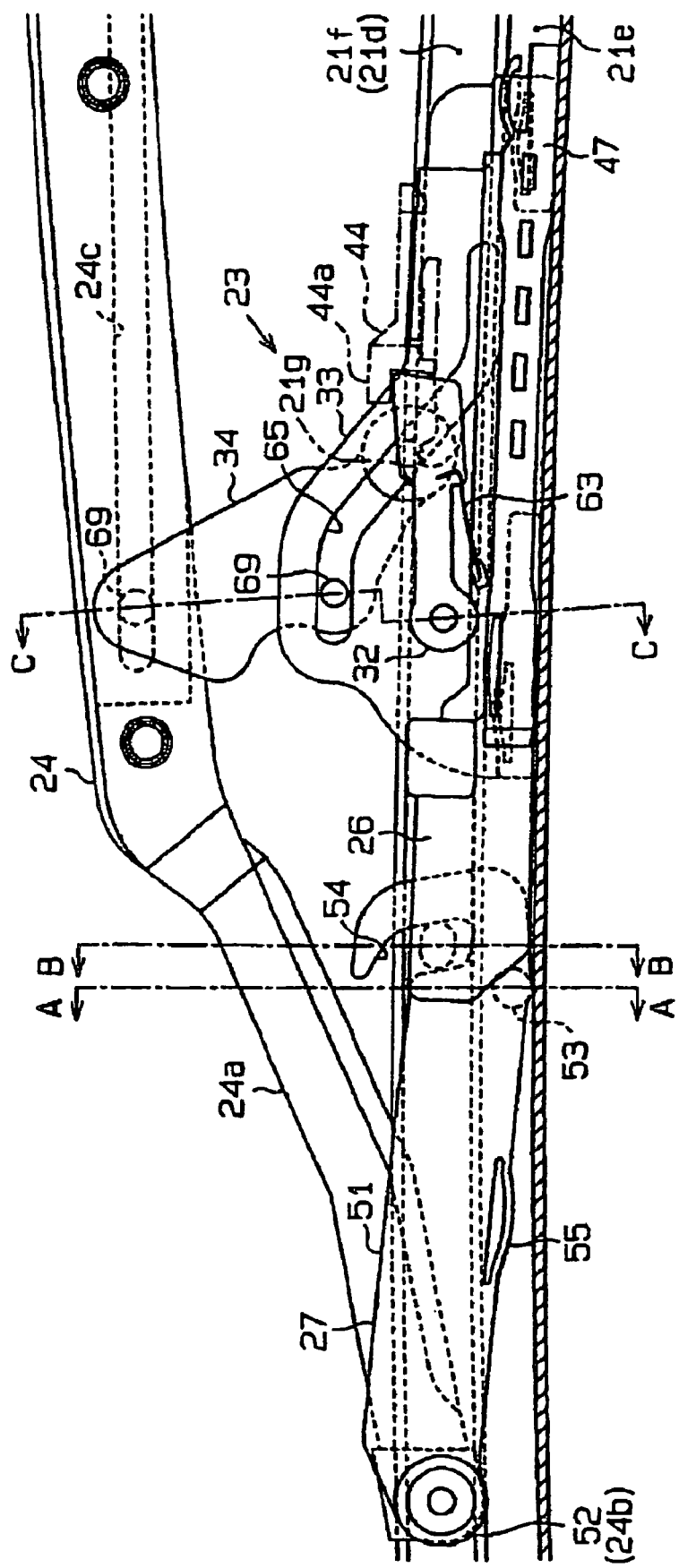
FIG. 9 illustrates an enlarged view indicating a rear portion of FIG. 1C.
Figure 10C:
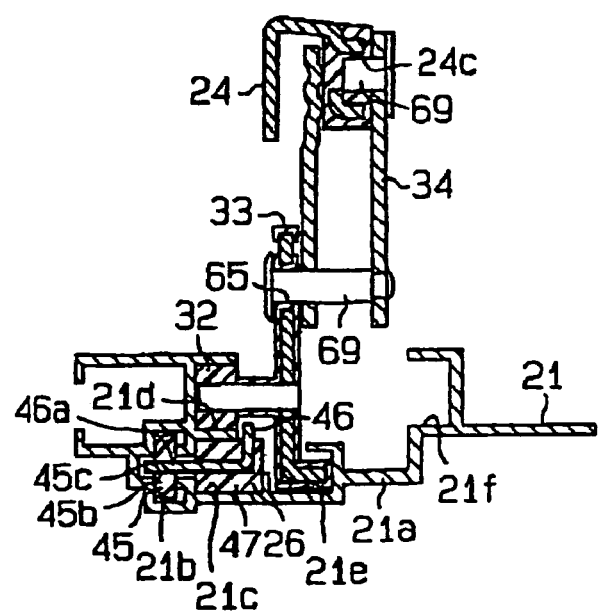

The rear portion of the sunroof apparatus 11 shown in FIG. 1C is enlarged in FIG. 9. As shown in FIG. 9, the functional bracket 24 is moved in a rear direction to be in a predetermined position where the engaging pin 69 is positioned at the front end of the guide groove 24c when the sunroof apparatus 11 is in the fully opened state after the aforementioned movement. At this point, the front check block 27 is positioned at the front side near the lifting guide 33. Thus, the front check block 27 is not engaged with the lifting guide 33 while the sunroof apparatus 11 is opened. At this point, the guide shoe 47 of the front shoe 26 reaches the position where the rear shoe 31 is positioned in the closed state (FIG. 9 and FIG. 10C), however; the guide shoe 47 of the front shoe 26 is never engaged with the rear shoe 31 because the rear shoe 31 has been further moved in a rear direction.

The front shoe 26 being in the opened state is moved back to the front side in the reverse order of the aforementioned processes. The behavior of the sunroof apparatus 11 (mechanism section 20) having the aforementioned configuration will be summarized as follows. When the movable panel 13 is in the closed state, and the drive belt 45 is driven to move to the rear, the front shoe 26 and the rear shoe 31, connected to the drive belt 45, are integrally moved to the rear. As the rear shoe 31 is moved to the rear, the rear check block 32 being in the engaging state by means of the engaging pin 58 is moved to the rear integrally with the lifting guide 33 which is connected to the rear check block 32. Further, as the lifting guide 33 is moved to the rear, the guide pin 68 of the lifting link 34 which is penetrated into the guide hole 65 is pushed up along the guide hole 65, as a result the lifting link 34 is rotated in the clockwise direction as the top end thereof is moved to be lifted.

As the rear shoe 31 is moved in the rear, and the rear check block 32 reaches the notch 21g, the engaging portion 62 of the rear check block 32 is fitted into the notch 21g with biasing force of the biasing member 63 and rotated in the upward direction to be regulated by the regulating piece 44a of the stopper 44. Thus, the movable panel 13 is tilted-up as the back portion of the functional bracket 24 is moved upward. Until the tilted-up operation has been done, only the front shoe 26 is moved in the rear as the upper surface 51a of the lever portion 51 is pushed by the engaging pin 48, and the front check block 27 and the front portion of the functional bracket 24 connected thereto are not moved. In other words, during the end portion of the functional bracket 24 is lifted up so as to be in the tilted-up state, only the back portion of the functional bracket 24 is moved, and the front portion of the functional bracket 24 is supported in order to stabilize the tilt-up operation, at the same time, the load generated while such operations are conducted at a time can be inhibited.

When the tilt-up operation is done, the rear shoe 31 is disconnected from the rear check block 32 which is connected to the rear shoe 31 with the engaging pin 58, since then the rear shoe 31 is moved in the rear on the first guide portion 21c as aforementioned above.

While the movable panel 13 is in the tilted-up state, and the drive belt 45 is driven and further moved in the rear, the front shoe 26 and the rear shoe 31 are integrally moved in the rear. At this point, the front check block 27 (and the functional bracket 24) whose movement in the upward direction is limited by the engaging pin 48a of the front shoe 26 is disengaged from the engaging pin 48a of the front shoe 26 so as to move in the upward direction. Then, while the inner surface of the engaging groove 54 is pushed by the engaging pin 48a, the engaging groove 54 of the front check block 27 is pushed up as the guide pin 52 moves along the first guide groove portion 41a of the guide groove 41, and the regulating pin 53 is moved upward along the regulating groove 43. At this point, the regulating pin 53 is guided to be attached to the third guide portion 21e at which the regulating groove 43 is connected.

The front shoe 26 being in the tilted-up state is further moved to the rear, the regulating pin 53 of the front block 27 is moved along the third guide portion 21e, and the guide pin 52 is moved in the oblique upward direction along the second guide groove portion 41b of the guide groove 41. Accordingly, the arm portion 24a of the functional bracket 24 which is connected to the front check block 27 is lifted up. At this point, the guide pin 52 moved upward is guided to be attached to the second guide portion 21d at which the guide groove 41 is connected through the third guide grove portion 41c, at the same time, the guide pin 24b of the functional bracket 24 is guided to be attached to the firth guide portion 21f at which the guide groove 42 is connected through the third guide groove portion. As the front shoe 26 is further moved to the rear, the front check block 27 is moved to the rear as the guide pin 52 and the regulating pin 53 are guided by the second guide portion 21 and the third guide portion 21e respectively. Then, the functional bracket 24 is moved to be in the fully-opened state as the guide pin 24b is guided by the fourth guide portion 21f at the front portion thereof, and as the engaging pin 69 is guided by the guide groove 24c at the back portion thereof.

While the drive belt 45 is driven to move to the front when the movable panel 13 is in the fully-opened state, the movable panel 13 is moved to be in the tilted-up state, then moved to be in the closed state in the reverse order of the aforementioned process. While the movable panel 13 is moved to the tilted-up state, only the front portion of the functional bracket 24 is moved, and the rear portion of the functional bracket 24 is supported in order to stabilize the closing operation of the movable panel 13. The load generated while such operations are conducted can be inhibited.

The first embodiment has the following effects.

(1) According to the first embodiment, the front shoe 26 and the rear shoe 31 are supported at the first guide portion 21c of the guide rail 21. Thus, front shoe 26 and the rear shoe 31, spaced with a predetermined distance in a longitudinal direction of the vehicle and connected to the drive belt 45, are moved on the first guide portion 21c in a longitudinal direction of the vehicle, so that the front shoe 26 is not engaged with the rear shoe 31 while the movement of the front portion of the functional bracket 24 is controlled by the front shoe 26, and the movement of the rear portion of the functional bracket 24 is controlled by the rear shoe 31. Further, when the front portion of the functional bracket 24 is moved to the rear to be in the fully-opened state by moving the front shoe 26 to the rear, the front shoe 26 can be moved to be in the initial position of the rear shoe 31 (at this point, the rear shoe 31 has been moved to the rear) without the rear check block 32 interfering with the lifting guide 33. Thus, the moving amount (slide stroke) of the front portion of the functional bracket 24 in the backward direction can be increased in accordance with the moving amount of the front shoe 26 in the backward direction. Thus, the movable panel 13 supported at the functional bracket can be opened as wide as possible.

Further, the cross sectional area of the guide rail 21 and a space for the guide rail 21 can be reduced compared to the case, for example, when a plurality of brackets is provided in order to support the front shoe 26 and the rear shoe 31 respectively. Then, the area of the roof opening portion 10a can be increased by the reduced area of the guide rail 21.

Furthermore, the front shoe 26 controls the movement of the front portion of the functional bracket 24 through the front check block 27, and the rear shoe 31 controls the movement of the rear portion of the functional bracket 24 through the lifting guide 33 and the lifting link 34, and each movement is controlled by the drive of the drive belt 45. Thus, there is no need to provide a long check block for controlling the movement of the rear portion of the functional bracket 24, which is needed when, for example, the drive of the driving member is transmitted to only the front shoe. Further, increment of the slide resistance which may caused when the accuracy is reduced due to such long check block or increment of the cross section area of the guide rail 21 can be avoided.

(2) According to the first embodiment, the rear shoe 31 is positioned adjacent to the drive belt 45, and the rear check block 32 is adjacently positioned above the rear shoe 31. The lifting guide 33 is positioned adjacent to the rear shoe 31 and the rear check block 32, and the lifting link 34 and the functional bracket 24 is positioned adjacent to the lifting guide 33. Specifically, the rear shoe 31, rear check block 32 and the lifting guide 33 are eccentrically-located between the drive belt 45 and the functional bracket 24. Thus, the cross sectional area of the guide rail 21 and a space for the guide rail 21 can be reduced, compared to the case when such members are provided on both sides of the functional bracket 24. Then, the area of the roof opening portion 10a can be increased by the reduced area of the guide rail 21.

Further, a drive from the drive belt 45 transmits among the abutting members. Specifically, a drive is transmitted to the rear shoe 31 through the drive belt 45 and the rear check block 32 which are provided adjacent to the rear shoe 31, and the drive is transmitted to the rear check block 32 through the rear shoe 31 and the lifting guide 33 which are provided adjacent to the rear check block 32. The drive is transmitted to the lifting guide 33 through the rear check block 32 and the functional bracket 24 through the lifting link 34 which are provided adjacent to the lifting guide 33. Specifically, a drive from the drive belt 45 is transmitted in order without offsetting among the abutting members in order to lift up the rear portion of the functional bracket 24. Thus, during the lifting operation of the rear portion of the functional bracket 24, sliding of the rear shoe 31, the rear check block 32 and the lifting guide 33 can be inhibited, so that the slide resistance of the rear shoe 31, rear check block 32 and the lifting guide 33 can be reduced so as to enhance the efficiency of the lifting operation and stabilize the lifting operation.

Furthermore, when the front portion of the functional bracket 24 is moved to the rear to be in the fully-opened state in accordance with the movement of the front shoe 26 to the rear, the moving amount of the front shoe 26 to the rear can be increased because the rear check flock 32, the lifting guide 33 and the front shoe 26 are juxtaposed. Accordingly, the moving amount (slide stroke) of the front portion of the functional bracket 24 can be increased.

(3) According to the first embodiment, the front check block 27 is positioned adjacent to the front shoe 26. Specifically, the front shoe 26 and the front check block 27 are eccentrically-located between the drive belt 45 and the front check block 27. Thus, the cross sectional area of the guide rail 21 and a space for the guide rail 21 can be reduced, compared to the case when such members are provided on both sides of the functional bracket 24. Then, the area of the roof opening portion 10a can be increased by the reduced area of the guide rail 21.

Further, a drive from the drive belt 45 transmits among the abutting members. Specifically, a drive is transmitted to the front shoe 26 through the drive belt 45 and the front check block 27 which are provided adjacent to the front shoe 26, and the drive is transmitted to the front check block 27 through the front shoe 26 and the functional bracket 24 which are provided adjacent to the rear check block 32. Specifically, a drive from the drive belt 45 is transmitted in order among the abutting members without offsetting in order to lift up the rear portion of the functional bracket 24. Thus, during the lifting operation of the front portion of the functional bracket 24, sliding of the front shoe 26 and the front check block 27 can be inhibited, so that the slide resistance of the front shoe 26 and the front check block 27 can be reduces so as to enhance the efficiency of the lifting operation and stabilize the lifting operation.

(4) According to the first embodiment, the front shoe 26 is positioned adjacent to the drive belt 45 as a driving member and adjacent to the front check block 27 as a front functional member. In addition, the rear shoe 31 is also provided adjacent to the drive belt 45 and the rear check block as a rear functional member. In this configuration, each component can be downsized. As a result, the cost for forming such components can be reduced. Further, the form of the front shoe 26 may be identical with the form of the rear shoe 31 if the connecting portion with each check block (27, 32) is provided independently. In this configuration, such components having same form can be formed with a same mold; as a result, the cost for forming such components can be further reduced. The cross section area of the guide rail 21 can be reduced according to the miniaturization of the components, and the cost can be further reduced.

(5) According to the first embodiment, the drive belt 45 is connected to the front shoe 26 as the mounting pieces 46a of the front shoe 26 are fitted into the mounting holes 45c of the drive belt 45. In a similar way, the drive belt 45 is connected to the rear shoe 31 as the mounting pieces 56a of the rear shoe 31 are fitted into the mounting holes 45c of the drive belt 45. Thus, the front shoe 26 and the rear shoe 31, spaced at the front and the rear for respectively transmitting the drive from the drive motor 45, are connected to the drive belt 45 in a simple manner. As a result, the cost of the sunroof apparatus 11 can be reduced.

For example, if each shoe (front and rear) for transmitting the drive from the drive motor is formed with space on a drive wire of the drive belt 45, a large mold is needed; and as a result, the cost of the mold may be increased. According to the first embodiment, such problems can be prevented.

In other ways, to avoid using such a large mold in order to form the shoe, a long check block may be provided for controlling the movement of the rear portion by forming only a front shoe on the drive wire. In this case, operational resistance which may be generated by warp of the component or the increment of the sliding area can be reduced.

Second Embodiment

A second embodiment according to the present invention will be explained hereinbelow referring to the attached drawings. In the second embodiment, the configuration of the rear mechanism section in the first embodiment is different. Specifically, in the second embodiment, the space for the rear mechanism section is smaller, and the functional bracket 24 is moved higher in order to tilt-up the movable panel 13. The mechanisms other than such configuration are common in both embodiments, so that the explanation of such common mechanism will be abbreviated.

Figure 13:
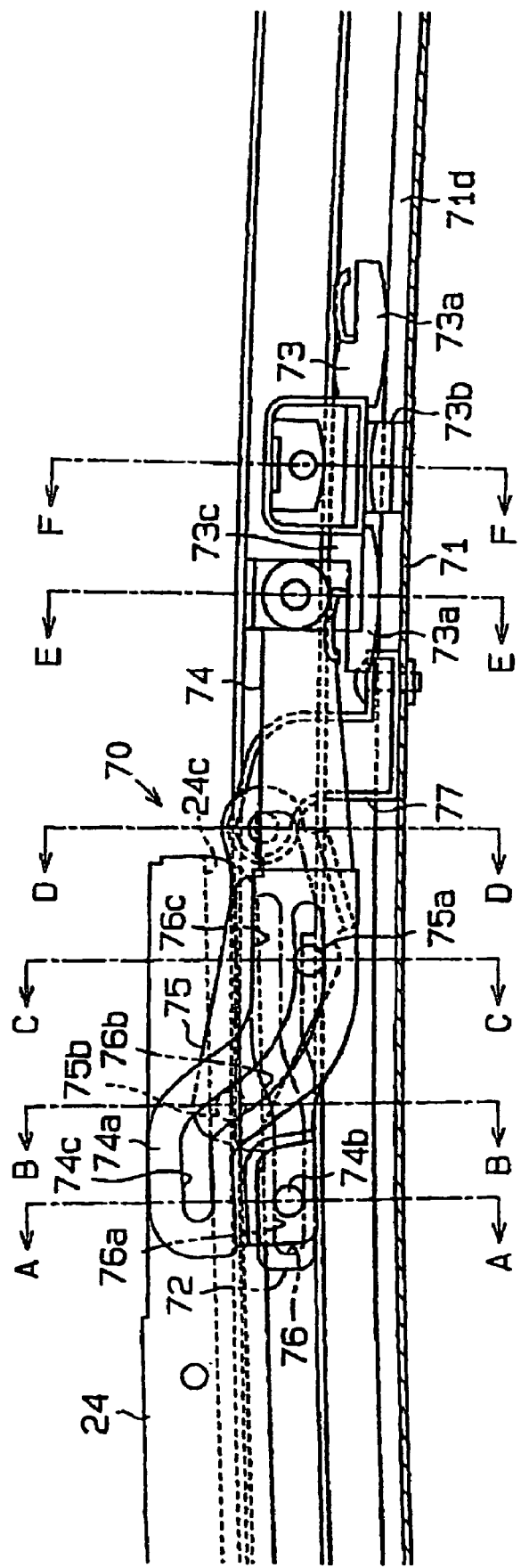
FIG. 13 illustrates a side view indicating a second embodiment according to the present invention.
Figure 14:
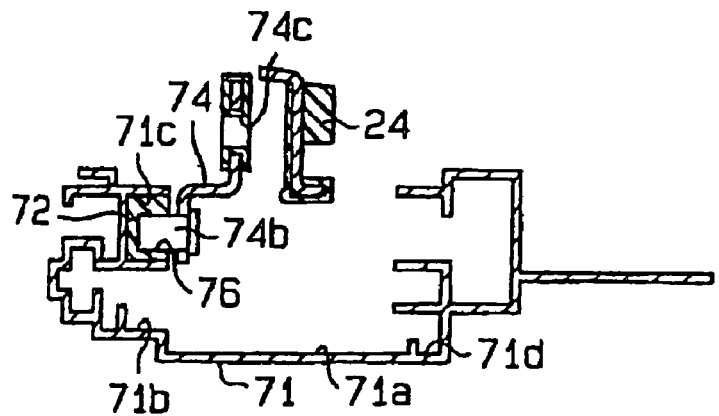
FIG. 14A, FIG. 14B, FIG. 14C, FIG. 14D, FIG. 14E and FIG. 14F illustrates cross sections of FIG. 13 along lines A-A, B-B, C-C, D-D, E-E and F-F.
Figure 14:
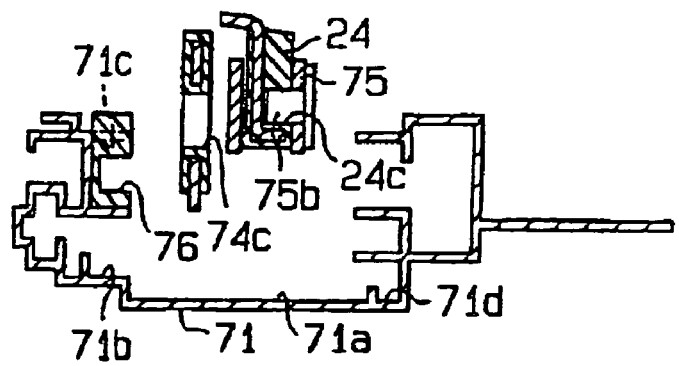
Figure 14:
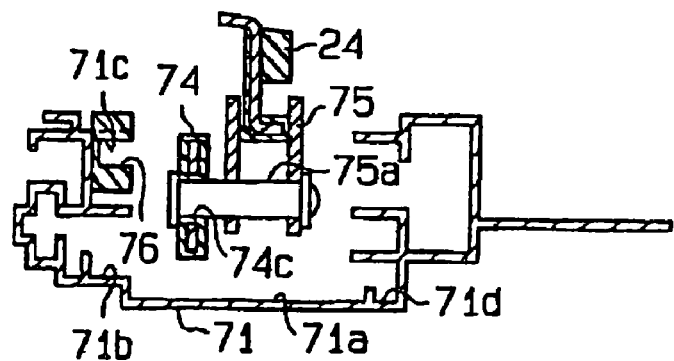
Figure 14D:
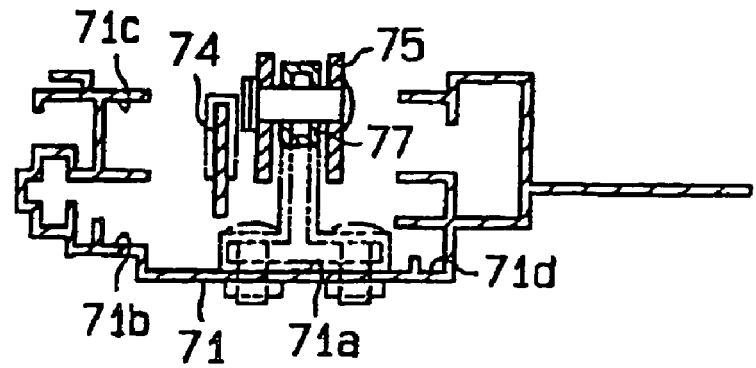
Figure 14E:
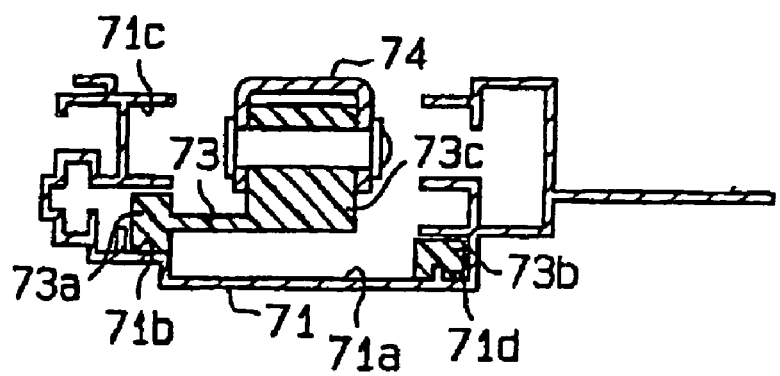
Figure 14F:
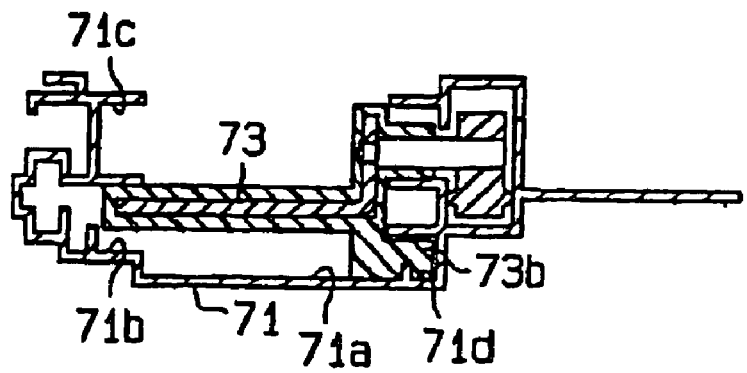
Figure 15:
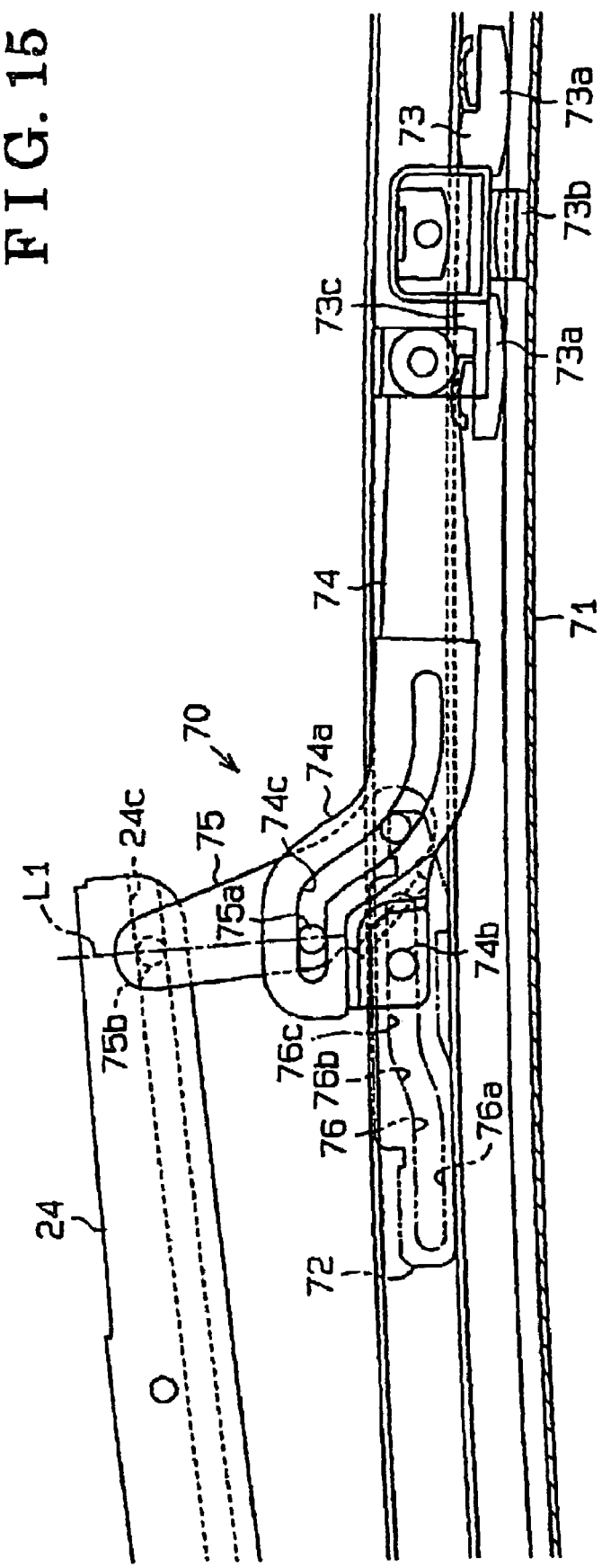
FIG. 15 illustrates a side view indicating behavior of the second embodiment according to the present invention.

FIG. 13 illustrates a side view of a rear mechanism section 70 for tilting-up the movable panel 13 and a guide rail 71 supporting for the rear mechanism section 70, where the rear mechanism section 70 is in the closed state. More specifically, in FIG. 13, the rear mechanism section 70 provided at one side of the vehicle (right side in front direction) is seen from inside of the vehicle, and a left hand in FIG. 13 indicates the front, and a right hand in FIG. 13 indicates the rear. FIG. 14A illustrates a cross section of FIG. 13 along a A-A line, FIG. 14B illustrates a cross section of FIG. 13 along a C-C line, FIG. 14C illustrates a cross section of FIG. 13 along a B-B line, FIG. 14D illustrates a cross section of FIG. 13 along a D-D line, FIG. 14E illustrates a cross section of FIG. 13 along a E-E line, and FIG. 14F illustrates a cross section of FIG. 13 along a F-F line. FIG. 15 illustrates a side view of the movable panel 13 being in the tilted-up state. The rear mechanism section 70 includes a guide block 72, a rear shoe 73, a lifting guide 74 and a lifting link 75.

The guide rail 71, housing the front mechanism section, also houses the rear mechanism 70 to be capable of a predetermined actuation. Specifically, as shown in FIG. 14, the guide rail 71 includes approximately an identical sectional form in a longitudinal direction thereof. The guide rail 71 includes a plate portion 71a provided at the center portion in the width direction thereof. A first guide portion 71b and a second guide portion 71c are provided on the one side of the plate portion 71a (left in FIG. 14). The second guide portion 71c positioned adjacent above the first guide portion 71b, on the other hand, a third guide portion 71d is formed on the other side of the plate portion 71a (right in FIG. 14).

The guide block 72 is made of resin and fixed to the second guide portion 71c at the front of the lifting link 75. The guide block 72 is formed not to project relative to the second guide portion 71c in the width direction thereof, and formed to project relative to the upper wall portion of the second guide portion at the rear end thereof (FIGS. 14A, B and C). A guide groove 76 is formed on the outer surface of the guide block 72. The guide groove 76 includes a first guide groove portion 76a extending to the rear in a longitudinal direction of the guide rail 71, a second guide groove portion 76b extending to the rear in obliquely upward direction and connected to the first guide groove portion 76a and a third guide groove portion 76c extending to the rear in a longitudinal direction of the guide rail 71 and connected to the second guide groove portion 76b. The guide groove 76 of the guide block 72 is engaged with the lifting guide 74 so as to lift up the lifting guide 74.

The rear shoe 73 is slidably supported by the guide rail 71. Specifically, as shown in FIG. 14E and FIG. 14F, the rear shoe 73 includes a first guide shoe 73a extending relative to the first guide portion 71b and a second guide shoe 73b extending relative to the third guide portion 71d. The rear shoe 73 is supported by the guide rail 71 as the first guide shoe 73a is attached to the first guide portion 71b, and the second guide shoe 73b is attached to the third guide portion 71d.

The rear shoe 73 is connected to a drive member (not shown), the rear shoe 73 moves on the guide rail 71 (on the first guide portion 71b and the third guide portion 71d) in conjunction with the movement of the drive member in a longitudinal direction of the guide rail 71.

A mounting portion 73c extending upwards at the enter portion of the first guide shoe 73a and the second guide shoe 73b is formed on the front portion the rear shoe 73. The lifting guide 74 is rotatably supported by the mounting portion 73c (see FIG. 13 and FIG. 14E). The lifting guide 74 includes a lever portion 74a extending from the rotational center of the lifting guide 74 in a front direction adjacent to the guide block 72 and a guide pin 74b provided at the front portion of the lever portion 74a and inserted into the guide groove 76. Thus, the lifting guide 74 is moved rearward in accordance with the movement of the rear shoe 73 to the rear, the guide pin 74b of the lifting guide 74 is moved upwards along the guide groove 76, and the lever portion 74a is rotated in a clockwise direction so as to be lifted up. While the movable panel 13 is in the tilted-up state, the guide pin 74b moved upwards along the guide groove 76 is positioned at the rear end of the guide groove 76 (the third guide groove portion 76c) which is the top portion of the guide groove 76.

A guide hole 74c is formed at the lifting guide 74. The guide hole 74c extends from the front to the rear in the obliquely downward direction. The lifting guide 74 engaged with the lifting link 75 through the guide hole 74c lifts up/down the lifting link 75 in conjunction with its upwards/downwards movement in accordance with the movement in a longitudinal direction thereof. Specifically, the lifting link 75 is rotatably supported by the bracket 77 secured by the plate portion 71a of the guide rail 71 at the center portion of the rotational center of the guide block 72 and the lifting guide 74. The lifting link 75 includes a guide pin 75a inserted into the guide hole 74c at the front side of the rotational center. The guide pin 75a is provided at the lower rear end of the guide hole 74c in the closed state. Thus, when the lifting guide 74 is moved to the rear in such state, the lifting guide 74 moves the guide pin 75a in upward direction along the guide hole 74c, as a result the lifting link 75 is rotated in a clock wise direction as the end portion thereof is lifted up.

As shown in FIG. 15, the guide pin 75a moved upwards along the guide hole 74c in the tilted-up state is positioned at the front end of the guide hole 74c which is the most top position of the guide hole 74c. Thus, the lifting link 75 is further lifted by virtue of intensifying the degree of the upward movement of the lever portion 74a caused by the rear movement of the lifting guide 74, in other words, the degree of the upward movement at the front end of the guide hole 74c.

In the second embodiment, an engaging pin 75b for supporting the functional bracket 24 is provided at the end of the lifting link 75, and the rear portion of the functional bracket 24 is supported by the guide groove 24c into which the engaging pin 75b of the lifting link 75 is inserted in the same manner as the first embodiment. The rear shoe 73 is brought back to the front in the reverse order.

As shown in FIG. 15, the guide pin 75a is provided at front side relative to the line L1 which is an extended line connecting the guide pin 75a of the lifting link 75 and the engaging pin 75b when the movable panel 13 is in the tilted-up state in order to stabilize the lifting guide 74 by receiving force for rotating the lifting guide 74 in an anticlockwise direction generated by the functional bracket 24 which supports the lifting link 75.

As aforementioned above, the second embodiment, which already has same effects as the first embodiment, includes following additional effects.

(1) According to the second embodiment, the lifting guide 74 is rotated in upward/downward direction by engaging with the guide block 72 in accordance with the movement of the guide rail 71 in a longitudinal direction of the vehicle. Then, the lifting link 75 is rotated in upward/downward direction by engaged with the lifting guide 74 in accordance with the movement of the lifting guide 74. Thus, the degree of the upward movement of the rear portion of the functional bracket 24 depends on the degree of upward movements of the lifting guide 74 and the lifting link 75. Thus, the degree of the upward movement (tilting-up amount) of the rear portion of the functional bracket 24 relative to the moving amount of the rear shoe 73 can be enhanced compared to the known apparatus disclosed in such as JP3169740A, in which the lifting link is rotated only by moving the lifting guide along the guide rail as following the shoe. Thus, when the movable panel 13 is opened by sliding the functional bracket 24 to the rear, enough tilting-up amount can be obtained with securing a distance (maintaining span) between the front supporting position and the rear supporting position to avoid lack of strength due to insufficient maintaining span, lack of ventilation or noise associated with air current due to a small tilting-up amount.

Further, the lifting guide for regulating the rotation amount of the lifting link 75 has a great influence on the space in a vertical direction. In the second embodiment, the degree of the rotation of the lifting link 75 depends on not only the lifting guide 74. As a result, the height of the lifting guide 74 can be decreased.

(2) According to the second embodiment, the guide block 72 is engaged with the lifting guide 74 by inserting the guide pin 74b into the guide groove 76. Thus, the configuration can be simplified.

(3) According to the second embodiment, while the functional bracket 24 is in the tilted-up state, the guide pin 74b by which the lifting guide 74 is supported to the guide block 72 located on the opposite side of the rotational center of the lifting guide 74 relative to the guide hole 74c at which the load of the functional bracket 24 is received through the lifting link 75. Thus, the lifting guide 74 by which the load of the functional bracket is received can be stably supported by the guide block 72.

Third Embodiment

A third embodiment according to the present invention will be explained hereinbelow referring to the attached drawings. The third embodiment relates to a forming process of a guide rail. Such process especially relates to the guide rail 21 in the first embodiment and the guide rail 71 in the second embodiment, however, the process may be effective for any long rails. These rails, including the guide rail 21, the guide rail 71 and other long rails, is referred to as a guide rail 81 hereinafter. Each functional component of the sunroof apparatus 11 is to be provided on the guide rail 81 in the same manner as the first embodiment and the second embodiment.

Figure 16:
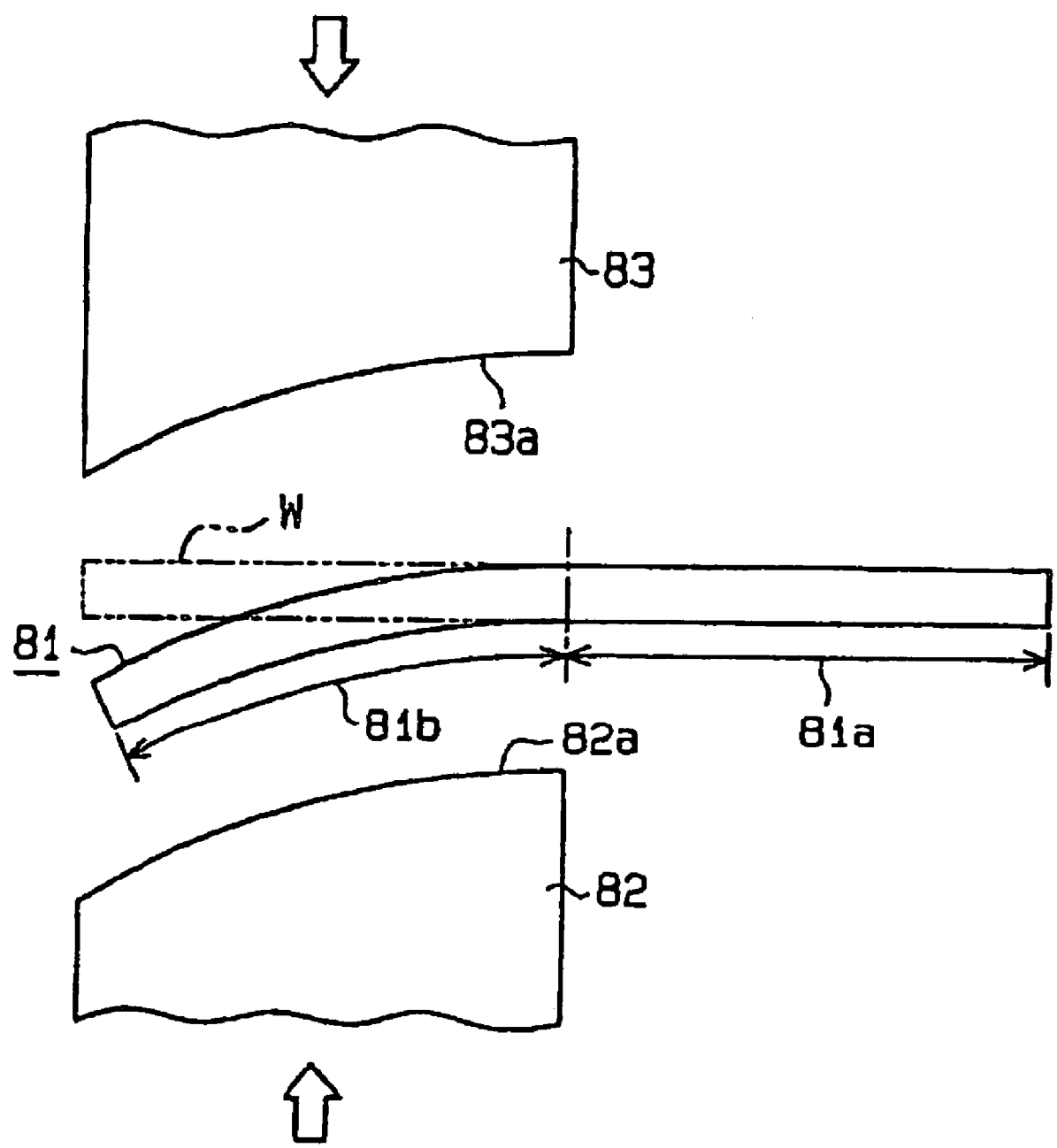
FIG. 16 illustrates a diagram indicating a third embodiment according to the present invention.

FIG. 16 illustrates a diagram of the forming process of the guide rail 81. As shown in FIG. 16, the guide rail 81 includes a straight portion 81a extending in a longitudinal direction of the vehicle along the slight curve of the vehicle roof 10 and a curved portion 81b which linked to the straight portion 81a. Generally, the curved portion 81b is formed in accordance with a taper portion of the front portion of the vehicle roof 10, and the straight portion 81a is formed in accordance with the straight portion of the rear portion of the vehicle roof 10, however, the configuration of the guide rail 81 is not limited to such configuration. A work (material) W which has an original form before the curved portion 81b is formed is also shown in FIG. 16. The work made of aluminum is formed by extrusion molding. The work has an identical cross section form in a longitudinal direction from one end thereof to the other end thereof.

The work W is bent with a pressing machine, specifically, the work W is positioned on the pressing machine with an upper mold 83 and a lower mold 82 which are positioned in accordance with the curved portion 81b. A pressing surface 82a of the lower mold 82 and a pressing surface 83a of the upper mold 83 are curved in accordance with the shape of the curved portion 81b with consideration of a springback which occurs after the bending process. Thus, the work W is pressed while being sandwiched between the lower mold 82 and the upper mold 83, and the work W id deformed so as to form the guide rail 81 having the curved portion 81b.

Generally, the guide rail made of aluminum is deformed to be identical with the design of the vehicle roof by a pressing machine or a bender. A process with a bender may diminish the accuracy, which needs an additional check process or fixing process, and as a result, the cost may be increased. On the other hand, in a bending process with the pressing machine, the level of material yield may be diminished. Further, if a hole is formed on the guide rail, the process should performed after the bending process. That means most holes should be formed in a cutting process, and as a result, the cost may be increased.

According to the third embodiment, an area where the work W is pressed in accordance with the design of the roof of the vehicle is limited. Thus, springback due to pressing can be diminished, and as a result, deformation as a whole and cross section can be inhibited. Such additional check process or fixing process may be slipped because the process accuracy is enhanced, so that the cost can be decreased. Further, the guide rail is formed with small molds, so that the cost of the mold can be decreased.

When a hole or a notch is formed on the guide rail 81, the process accuracy can be more enhanced by pressing after a hole or a notch is formed on the work W so as to inhibit the springback due to various cross-sectional strengths.

The height of the guide rail in vertical direction can be decreased because the guide rail 81 is formed in approximately the same shape of the design of the roof 10 even if the roof 10 has a slight curve.

According to the first embodiment of the present invention, the front shoe 26 and the rear shoe 31 are connected to the single drive belt 45 however, the drive belt 45 may be divided between the front shoe 26 and the rear shoe 31 for the sake of a convenience. For example, a transmitting member may be provided, which is integrally connected to the end of the drive belt, and attached to the belt guide portion 21, so that the front shoe 26 is connected to the drive belt, and the rear shoe 31 is connected to such transmitting member. In other words, the drive member may comprise the drive belt and the transmitting member.

According to the first embodiment of the present invention, the drive belt 45 is used as the drive member, however, another member such as a drive wire may be used instead.

According to the first embodiment of the present invention, another configuration may be used for controlling the movement of the front portion of the functional bracket 24 by means of the front shoe 26. For example, two members, which work in pairs as the front shoe 26, may be used for controlling the movement of the front portion of the functional bracket 24.

According to the first embodiment of the present invention, the front potion of the movable panel 13 (the functional bracket 24) is moved in upward and downward direction. Accordingly, the movable panel 13 slides along the guide rail 21, however, the components may just slide along the guide rail 21.

According to the first embodiment of the present invention, the movable panel 13 is moved by so called an outer sliding system, in which the movable panel 13 slides outside of the vehicle, however, the movable panel 13 may be moved by so called an inner sliding system, in which the movable panel 13 slides inside of the vehicle.

According to the second embodiment of the present invention, a rotational timing of the lifting guide 74 by virtue of the engagement with the guide block 72 may be disagree with a rotational timing of the lifting link 75 by virtue of the engagement with the lifting guide 74. For example, the lifting guide 74 is rotated to be moved in upward and downward at first, and then the lifting link 75 is rotated to be moved in upward and downward. In such case, the lifting link 75 is moved in upward and downward in stages, so that intensive drive force is not be needed.

According to the second embodiment of the present invention, a timing at which the guide pin 74b reaches a front end of the tapered portion of the guide groove 76 does not agree with a timing at which the guide pin 75a reaches a rear end of the tapered portion of the guide hole 74c. In this case, a rotational timing at which the lifting link 75 is fully moved downwards by means of the lifting guide 74 is not in agreement with a rotational timing at which the lifting guide 74 is fully moved downwards by means of the guide block 72, so that while the movable panel 13 is closed when the vehicles is running, sufficient drive force can be secured, which can resist air pressure (external force) at just before the movable panel 13 is closed.

According to the second embodiment, the guide groove 76 formed on the guide block 72 may be a hole unless the pin 74b is guided therethrough. The guide hole 74c formed on the lifting guide 74 may be a groove unless the guide pin 75a is guided thereinto.

According to the second embodiment, the configuration may be used for a sunroof apparatus which is tilted, not sliding.

According to the first embodiment and the second embodiment, another configuration may be used for controlling the movement of the rear portion of the functional bracket 24 by means of the rear shoe 31 and the rear shoe 73. For example, two members, which in pairs work as the rear shoe 31 and the rear shoe 73, may be used for controlling the movement of the end portion of the functional bracket 24.

In the first embodiment and the second embodiment, the sunroof apparatus 11 includes a single movable panel, however, the sunroof apparatus 11 may include a plurality of the movable panels. In this case, each panel can use common mechanism sections (the front mechanism section and the rear mechanism section), and also use a common front shoe 26 which transmits drive force from the drive motor at the front side and the rear shoes 31 and 73 which transmits drive force from the drive motor at the rear side. In other words, if the sunroof apparatus 11 includes a plurality of the movable panels 13, the drive bet 45 can be shared by a plurality of the front shoes 26 and the rear shoes 31 and 73 because these shoes have the common mounting pieces 46a and 56a. In this account, the number of the components can be reduced, as a result, the cost can be reduced.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A sunroof apparatus comprising:
    a movable panel provided on an opening portion of a vehicle roof and capable of tilting-up and sliding;
    a functional bracket that supports the movable panel;
    a drive member actuated to move in a longitudinal direction of a vehicle along a guide rail attached to the vehicle roof;
    a front shoe connected to the drive member for controlling the movements of a front portion of the functional bracket as a consequence of moving in a longitudinal direction of the vehicle along the guide rail in accordance with the movements of the drive member;
    a rear shoe connected to the drive member for controlling movement of a rear portion of the functional bracket as a consequence of moving in a longitudinal direction of the vehicle along the guide rail in accordance with the movements of the drive member;
    a guide block by which the rear portion of the functional bracket is secured to the guide rail;
    a lifting guide connected to the rear shoe and capable of rotating in upward and downward directions by virtue of moving in a longitudinal direction relative to the guide block;
    a lifting link supported by the lifting guide and causing the movable panel to tilt up by virtue of intensifying a degree of the upward movement of the lifting guide at a time of upward rotation;
    wherein the guide block includes a guide groove, and the lifting guide includes a first guide pin which is inserted into the guide groove, and wherein the lifting guide is rotated, as a consequence of the lifting guide moving in a longitudinal direction of the vehicle along the guide rail and the first guide pin guided along the guide groove and lifted up; and
    wherein the lifting guide includes a guide hole, and the lifting link includes a second guide pin which is inserted into the guide hole; wherein the lifting link is rotated, as a consequence of the lifting guide moving in a longitudinal direction of the vehicle along the guide rail and the second guide pin guided along the guide hole and lifted up; and wherein, when the rear portion of the functional bracket being tilted up is in an immobile state, the first guide pin is positioned further from the center of rotation of the lifting guide than the second guide pin.

2. The sunroof apparatus according to claim 1, wherein the guide groove of the guide block comprises a first guide groove portion, a second guide groove portion extending in an obliquely upward direction and connected to the first guide groove portion, and a third guide groove portion connected to the second guide groove portion.

3. The sunroof apparatus according to claim 1, wherein the guide rail comprises a first guide portion, a second guide portion and a third guide portion, and the rear shoe comprises a first guide shoe positioned in the first guide portion of the guide rail and a second guide shoe positioned in a third guide portion of the guide rail.

* * * * *